(12) United States Patent
Berger et al.

(10) Patent No.: US 12,484,081 B2
(45) Date of Patent: Nov. 25, 2025

(54) SUPERIMPOSED SOUNDING REFERENCE SIGNALS ON UPLINK DATA TRANSMISSIONS

(71) Applicant: QUALCOMM Incorporated, San Diego, CA (US)

(72) Inventors: Peer Berger, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 18/332,108

(22) Filed: Jun. 9, 2023

(65) Prior Publication Data

US 2024/0414751 A1 Dec. 12, 2024

(51) Int. Cl.
*H04W 72/541* (2023.01)
*H04L 5/00* (2006.01)
*H04W 72/0446* (2023.01)
*H04W 72/0453* (2023.01)

(52) U.S. Cl.
CPC ......... *H04W 72/541* (2023.01); *H04L 5/0051* (2013.01); *H04W 72/0446* (2013.01); *H04W 72/0453* (2013.01)

(58) Field of Classification Search
CPC ......... H04W 72/0446; H04W 72/0453; H04W 72/541; H04L 5/0051
See application file for complete search history.

(56) References Cited

U.S. PATENT DOCUMENTS

2014/0105130 A1  4/2014  Noh et al.
2020/0100194 A1*  3/2020  Nangia ............... H04L 5/005

FOREIGN PATENT DOCUMENTS

EP  3057245 A1  8/2016

OTHER PUBLICATIONS

International Search Report and Written Opinion—PCT/US2024/029063—ISA/EPO—Aug. 21, 2024.

* cited by examiner

*Primary Examiner* — Kent Krueger
(74) *Attorney, Agent, or Firm* — Holland & Hart LLP

(57) ABSTRACT

Methods, systems, and devices for wireless communication are described. A user equipment (UE) may identify a time and frequency resource allocated to an uplink shared channel and may identify a threshold signal-to-noise ratio (SNR) associated with the time and frequency resource. The UE may transmit both an uplink data signal and a sounding reference signal (SRS) via at least the time and frequency resource. The uplink data signal and the SRS may overlap in both time and frequency within the time and frequency resource. The uplink data signal may be transmitted using a first transmit power and the SRS may be transmitted using a second transmit power. The first transmit power and the second transmit power may be based on the threshold SNR.

30 Claims, 15 Drawing Sheets

SUPERIMPOSED SOUNDING REFERENCE SIGNALS ON UPLINK DATA TRANSMISSIONS

FIELD OF TECHNOLOGY

The following relates to wireless communication, including superimposed sounding reference signals (SRSs) on uplink data transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Some examples of such multiple-access systems include fourth generation (4G) systems such as Long Term Evolution (LTE) systems, LTE-Advanced (LTE-A) systems, or LTE-A Pro systems. Some other examples of multiple-access systems include fifth generation (5G) systems and sixth generation (6G) systems, which may be referred to as New Radio (NR) systems. These systems, among other generations of multiple-access systems, may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE).

SUMMARY

The described techniques relate to improved methods, systems, devices, and apparatuses that support superimposed sounding reference signals (SRSs) on uplink data transmissions. For example, the described techniques provide a framework for transmitting both an uplink data signal and an SRS via a same resource allocation. In some examples, a user equipment (UE) may identify a time and frequency resource allocated to an uplink shared channel. The UE may also identify a threshold signal-to-noise ratio (SNR) associated with the time and frequency resource. The UE may transmit both the uplink data signal and the SRS via at least the time and frequency resource. The uplink data signal and the SRS may overlap in both time and frequency within the time and frequency resource. The uplink data signal may be transmitted using a first transmit power and the SRS may be transmitted using a second transmit power. The first transmit power and the second transmit power may be based on the threshold SNR.

A method for wireless communications at a UE is described. The method may include identifying a time and frequency resource allocated to an uplink shared channel, identifying a threshold SNR associated with the time and frequency resource, and transmitting both an uplink data signal and an SRS via at least the time and frequency resource, where the uplink data signal and the SRS overlap in both time and frequency within the time and frequency resource, and where the uplink data signal is transmitted using a first transmit power and the SRS is transmitted using a second transmit power, the first transmit power and the second transmit power based on the threshold SNR.

An apparatus for wireless communications at a UE is described. The apparatus may include at least one processor, at least one memory coupled with the at least one processor, and instructions stored in the at least one memory. The instructions may be executable by the at least one processor to cause the apparatus to identify a time and frequency resource allocated to an uplink shared channel, identify a threshold SNR associated with the time and frequency resource, and transmit both an uplink data signal and an SRS via at least the time and frequency resource, where the uplink data signal and the SRS overlap in both time and frequency within the time and frequency resource, and where the uplink data signal is transmitted using a first transmit power and the SRS is transmitted using a second transmit power, the first transmit power and the second transmit power based on the threshold SNR.

Another apparatus for wireless communications at a UE is described. The apparatus may include means for identifying a time and frequency resource allocated to an uplink shared channel, means for identifying a threshold SNR associated with the time and frequency resource, and means for transmitting both an uplink data signal and an SRS via at least the time and frequency resource, where the uplink data signal and the SRS overlap in both time and frequency within the time and frequency resource, and where the uplink data signal is transmitted using a first transmit power and the SRS is transmitted using a second transmit power, the first transmit power and the second transmit power based on the threshold SNR.

A non-transitory computer-readable medium storing code for wireless communications at a UE is described. The code may include instructions executable by a processor to identify a time and frequency resource allocated to an uplink shared channel, identify a threshold SNR associated with the time and frequency resource, and transmit both an uplink data signal and an SRS via at least the time and frequency resource, where the uplink data signal and the SRS overlap in both time and frequency within the time and frequency resource, and where the uplink data signal is transmitted using a first transmit power and the SRS is transmitted using a second transmit power, the first transmit power and the second transmit power based on the threshold SNR.

In some examples of the method, apparatuses, and non-transitory computer-readable medium described herein, transmitting both the uplink data signal and the SRS may include operations, features, means, or instructions for transmitting a combination signal via at least the time and frequency resource, where the combination signal includes the uplink data signal and the SRS.

In some examples of the method, apparatuses, and non-transitory computer-readable medium described herein, transmitting the combination signal may include operations, features, means, or instructions for transmitting the uplink data signal via the time and frequency resource and transmitting the SRS via the time and frequency resource and at least a second time and frequency resource that may be also allocated to the uplink shared channel.

In some examples of the method, apparatuses, and non-transitory computer-readable medium described herein, at least a portion of the SRS may be superimposed upon at least a portion of the uplink data signal within the time and frequency resource and at least a portion of the uplink data signal may be superimposed upon at least a portion of the SRS within the time and frequency resource.

Some examples of the method, apparatuses, and non-transitory computer-readable medium described herein may further include operations, features, means, or instructions for transmitting an uplink message that indicates a capability of the UE to transmit SRSs via time and frequency resources allocated to the uplink shared channel, where the uplink data signal and the SRS overlapping in both time and frequency within the time and frequency resource may be based on the capability.

Some examples of the method, apparatuses, and non-transitory computer-readable medium described herein may further include operations, features, means, or instructions for receiving an indication of one or more parameters for transmission of SRSs via time and frequency resources allocated to the uplink shared channel, where transmitting the uplink data signal and the SRS via the time and frequency resource may be in accordance with the one or more parameters.

In some examples of the method, apparatuses, and non-transitory computer-readable medium described herein, the one or more parameters include a periodicity associated with the transmission of SRSs via time and frequency resources allocated to the uplink shared channel, or the threshold SNR, or both.

Some examples of the method, apparatuses, and non-transitory computer-readable medium described herein may further include operations, features, means, or instructions for transmitting, via a second time and frequency resource, a second SRS using a third transmit power that may be higher than the second transmit power.

In some examples of the method, apparatuses, and non-transitory computer-readable medium described herein, the time and frequency resource may be based on a first periodicity that may be associated with transmission of SRSs via time and frequency resources allocated to the uplink shared channel and the second time and frequency resource may be based on a second periodicity that may be associated with transmission of SRSs via time and frequency resources not allocated to the uplink shared channel.

In some examples of the method, apparatuses, and non-transitory computer-readable medium described herein, the second periodicity may be lower than the first periodicity.

In some examples of the method, apparatuses, and non-transitory computer-readable medium described herein, the second SRS may be usable at a network entity for estimating a property of a downlink channel between the UE and the network entity and the SRS may be usable at the network entity for tracking the property.

In some examples of the method, apparatuses, and non-transitory computer-readable medium described herein, identifying the threshold SNR may include operations, features, means, or instructions for receiving control signaling that indicates the threshold SNR.

In some examples of the method, apparatuses, and non-transitory computer-readable medium described herein, the control signaling includes DCI, a MAC-CE, or an RRC message.

In some examples of the method, apparatuses, and non-transitory computer-readable medium described herein, identifying the threshold SNR may include operations, features, means, or instructions for identifying, from among a set of threshold SNRs, the threshold SNR based on the time and frequency resource.

In some examples of the method, apparatuses, and non-transitory computer-readable medium described herein, the threshold SNR may be based on an MCS associated with the time and frequency resource, or a rank associated with the time and frequency resource, or both.

In some examples of the method, apparatuses, and non-transitory computer-readable medium described herein, the threshold SNR may be based on a SNR associated with decoding the uplink data signal.

A method for wireless communications at a network entity is described. The method may include obtaining both an uplink data signal and an SRS via at least a time and frequency resource allocated to an uplink shared channel, where the uplink data signal and the SRS overlap in both time and frequency within the time and frequency resource, and where the uplink data signal is obtained with a first received power and the SRS is obtained with a second received power that is less than the first received power, the first received power and the second received power based on a threshold SNR associated with the time and frequency resource, decoding the uplink data signal based on the first received power satisfying the threshold SNR, and processing the SRS based on decoding the uplink data signal.

An apparatus for wireless communications at a network entity is described. The apparatus may include at least one processor, at least one memory coupled with the at least one processor, and instructions stored in the at least one memory. The instructions may be executable by the at least one processor to cause the apparatus to obtain both an uplink data signal and an SRS via at least a time and frequency resource allocated to an uplink shared channel, where the uplink data signal and the SRS overlap in both time and frequency within the time and frequency resource, and where the uplink data signal is obtained with a first received power and the SRS is obtained with a second received power that is less than the first received power, the first received power and the second received power based on a threshold SNR associated with the time and frequency resource, decode the uplink data signal based on the first received power satisfying the threshold SNR, and process the SRS based on decoding the uplink data signal.

Another apparatus for wireless communications at a network entity is described. The apparatus may include means for obtaining both an uplink data signal and an SRS via at least a time and frequency resource allocated to an uplink shared channel, where the uplink data signal and the SRS overlap in both time and frequency within the time and frequency resource, and where the uplink data signal is obtained with a first received power and the SRS is obtained with a second received power that is less than the first received power, the first received power and the second received power based on a threshold SNR associated with the time and frequency resource, means for decoding the uplink data signal based on the first received power satisfying the threshold SNR, and means for processing the SRS based on decoding the uplink data signal.

A non-transitory computer-readable medium storing code for wireless communications at a network entity is described. The code may include instructions executable by a processor to obtain both an uplink data signal and an SRS via at least a time and frequency resource allocated to an uplink shared channel, where the uplink data signal and the SRS overlap in both time and frequency within the time and frequency resource, and where the uplink data signal is obtained with a first received power and the SRS is obtained with a second received power that is less than the first received power, the first received power and the second received power based on a threshold SNR associated with the time and frequency resource, decode the uplink data signal based on the first received power satisfying the threshold SNR, and process the SRS based on decoding the uplink data signal.

In some examples of the method, apparatuses, and non-transitory computer-readable medium described herein, obtaining both the uplink data signal and the SRS may include operations, features, means, or instructions for obtaining a combination signal via at least the time and frequency resource, where the combination signal includes the uplink data signal and the SRS.

Some examples of the method, apparatuses, and non-transitory computer-readable medium described herein may further include operations, features, means, or instructions for subtracting the decoded uplink data signal from the combination signal, where processing the SRS may be based on the subtracting.

In some examples of the method, apparatuses, and non-transitory computer-readable medium described herein, obtaining the combination signal may include operations, features, means, or instructions for obtaining the uplink data signal via the time and frequency resource and obtaining the SRS via the time and frequency resource and at least a second time and frequency resource allocated to the uplink shared channel.

Some examples of the method, apparatuses, and non-transitory computer-readable medium described herein may further include operations, features, means, or instructions for processing the SRS may be based on a processing gain of the SRS, in time or in frequency, across the time and frequency resource and the second time and frequency resource satisfying a threshold processing gain.

In some examples of the method, apparatuses, and non-transitory computer-readable medium described herein, the time and frequency resource occurs during a first slot and the second time and frequency resource occurs during the first slot or a second slot.

Some examples of the method, apparatuses, and non-transitory computer-readable medium described herein may further include operations, features, means, or instructions for processing the SRS may be based on a combined received power of the SRS across the time and frequency resource and the second time and frequency resource satisfying a second threshold SNR.

In some examples of the method, apparatuses, and non-transitory computer-readable medium described herein, at least a portion of the SRS may be superimposed upon at least a portion of the uplink data signal within the time and frequency resource and at least a portion of the uplink data signal may be superimposed upon at least a portion of the SRS within the time and frequency resource.

Some examples of the method, apparatuses, and non-transitory computer-readable medium described herein may further include operations, features, means, or instructions for obtaining an uplink message that indicates a capability of a UE to transmit SRSs via time and frequency resources allocated to the uplink shared channel, where the uplink data signal and the SRS overlapping in both time and frequency within the time and frequency resource may be based on the capability.

Some examples of the method, apparatuses, and non-transitory computer-readable medium described herein may further include operations, features, means, or instructions for outputting an indication of one or more parameters for transmission of SRSs via time and frequency resources allocated to the uplink shared channel, where obtaining the uplink data signal and the SRS via the time and frequency resource may be in accordance with the one or more parameters.

In some examples of the method, apparatuses, and non-transitory computer-readable medium described herein, the one or more parameters include a periodicity associated with the transmission of SRSs via time and frequency resources allocated to the uplink shared channel, or the threshold SNR, or both.

Some examples of the method, apparatuses, and non-transitory computer-readable medium described herein may further include operations, features, means, or instructions for obtaining, via a second time and frequency resource, a second SRS with a third received power that may be higher than the second received power.

In some examples of the method, apparatuses, and non-transitory computer-readable medium described herein, the time and frequency resource may be based on a first periodicity that may be associated with transmission of SRSs via time and frequency resources allocated to the uplink shared channel and the second time and frequency resource may be based on a second periodicity that may be associated with transmission of SRSs via time and frequency resources not allocated to the uplink shared channel.

In some examples of the method, apparatuses, and non-transitory computer-readable medium described herein, the second periodicity may be lower than the first periodicity.

Some examples of the method, apparatuses, and non-transitory computer-readable medium described herein may further include operations, features, means, or instructions for estimating a property of a downlink channel between a UE and the network entity based on the second SRS and tracking the property of the downlink channel based on the SRS.

In some examples of the method, apparatuses, and non-transitory computer-readable medium described herein, outputting control signaling that indicates the threshold SNR.

In some examples of the method, apparatuses, and non-transitory computer-readable medium described herein, the threshold SNR may be based on an MCS associated with the time and frequency resource, or a rank associated with the time and frequency resource, or both.

In some examples of the method, apparatuses, and non-transitory computer-readable medium described herein, the threshold SNR may be based on a SNR associated with decoding the uplink data signal.

DETAILED DESCRIPTION

Figure 1:
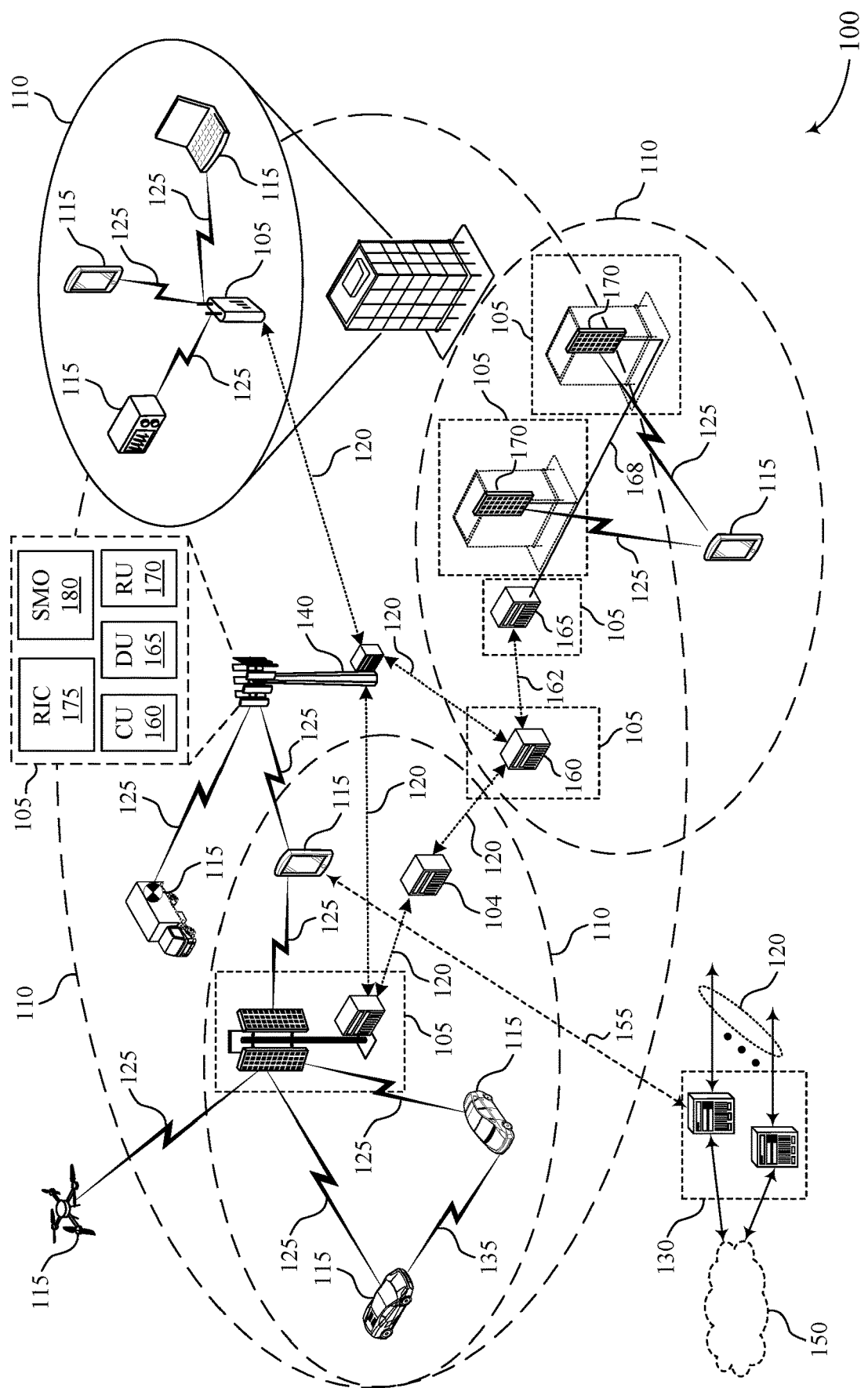
FIGS. 1 and 2 shows an example of a wireless communications system that supports superimposed sounding reference signals (SRSs) on uplink data transmissions in accordance with one or more aspects of the present disclosure.

Some wireless communications systems may support precoding operations for directional communications. For example, wireless communication devices operating within a wireless communications system may communicate via directional transmissions, in which beamforming may be applied to form a beam in a direction. In some examples of beamforming (e.g., for digital beamforming), signal processing techniques may be applied by a communication device (e.g., a transmitting communication device, a receiving communication device) to select, shape, or steer a beam (e.g., an antenna, a directional beam) along a spatial path between the communication device and one or more other communication devices. In some examples of beamforming, the spatial direction of the formed beam may depend on a set of parameters applied at the communication device (e.g., the communication device generating the beam). The set of parameters may be referred to herein as a precoder or a precoding matrix.

The wireless communications system may support one or more techniques for selecting a precoder. For example, the wireless communications system may include user equipment (UE) that support techniques for selecting a precoder for uplink communications (e.g., for selecting an uplink precoder). Additionally, or alternatively, the wireless communications system include one or more network entities that may support techniques for selecting a precoder for downlink communications (e.g., for selecting a downlink precoder). In some examples, a network entity may select a downlink precoder based on channel estimation performed at a UE. For example, the network entity may transmit a quantity of downlink reference signals to the UE over a downlink channel. The UE may perform one or more measurements on the downlink reference signals to estimate the downlink channel, and may report the estimated downlink channel to the network entity for selection of a downlink precoder. In some examples, the quantity of downlink reference signal transmitted from the network entity may be based on a quantity of antenna elements used at the network entity (e.g., for downlink communications). Additionally, in some examples, the quantity of antenna elements used at the network entity may be based on one or more radio frequencies used at the network entity (e.g., for downlink communications). For example, signals transmitted using relatively high radio frequencies may experience a relatively high path loss and, as such, the network entity may use an increased quantity of antennas for downlink transmissions with relatively high radio frequencies. In some examples, however, using an increased quantity of antennas to transmit downlink reference signals to the UE (e.g., for channel estimation) may lead to increased overhead.

In some other examples, the network entity may select a downlink precoder based on channel estimation performed at the network entity. For example, the network entity may assume that a downlink channel and an uplink channel between the network entity and the UE are reciprocal (e.g., that uplink channel conditions are relatively similar to downlink channel conditions). As such, the network entity may use uplink channel estimation to determine a downlink precoder. For example, the UE may transmit an uplink reference signal, such as a sounding reference signal (SRS), to the network entity over an uplink channel. The network entity use the SRS to estimate the uplink channel and, under the reciprocity assumption, select a downlink precoder based on the estimated uplink channel. In some examples, however, the UE may be configured to refrain from transmitting uplink data signals during time and frequency resources configured for SRS transmissions. Therefore, to maintain a suitable throughput for data communicated between the UE and the network entity, the UE may transmit SRSs relatively infrequently. In some examples, however, relatively infrequent SRS transmissions may lead to relatively infrequent opportunities for channel estimation at the network entity. Relatively infrequent channel estimation at the network entity may lead to a downlink precoder selected at the network entity (e.g., based on channel estimation using SRSs) becoming outdated. An outdated downlink precoder may degrade a performance of downlink communications between the UE and the network entity, which may reduce the throughput.

Various aspects of the present disclosure relate to techniques for superimposing SRSs on uplink data transmissions, or vice versa, and, more specifically, to a framework for superimposing an SRS on an uplink data signal, or vice versa. Examples herein may be described in terms of an SRS being superimposed on an uplink data signal, but it is to be understood that the techniques described herein are agnostic as to which signal is considered to be superimposed on the other and hence may also be applied to superimpose an uplink data signal on an SRS. In some examples, the UE may identify a time and frequency resource allocated to an uplink shared channel. For example, the network entity may configure the UE (or the UE may be otherwise configured) with a time and frequency resource allocated to an uplink shared channel for uplink data transmissions. In some examples, the UE may identify a threshold signal-to-noise ratio (SNR) based on the identified time and frequency resource. For example, the threshold SNR may correspond to an SNR for decoding uplink data signals transmitted via the time and frequency resource. In some examples, the UE may identify the threshold SNR based on signaling (e.g., downlink shared channel signaling, downlink control channel signaling) from the network entity. In some other examples, the UE may identify the threshold SNR (e.g., autonomously) from among a set of threshold SNRs configured at the UE.

The UE may transmit both an uplink data signal and an SRS via the identified time and frequency resource. As such, the uplink data signal and the SRS may overlap in both time and frequency within the time and frequency resource. In other words, the SRS may be superimposed on the uplink data signal (or the uplink data signal may be superimposed on the SRS) within the time and frequency resource. For example, the UE may additively combine the SRS signal with the uplink data signal to obtain a combined signal, and the UE may transmit the combined signal. In some examples, the UE may transmit the uplink data signal using a first transmit power, and may transmit the SRS using a second transmit power (e.g., the uplink data signal may be generated or otherwise processed in accordance with the first transmit power, and the SRS may be generated or otherwise processed in accordance with the second transmit power, such that the combined signal includes an uplink data signal component based on the first transmit power and an SRS component based on the second transmit power).

The second transmit power may be lower than the first transmit power, for example, to reduce a likelihood of the SRS degrading a performance of the uplink data signal. Additionally, in some examples, the first transmit power and the second transmit power may be based on the threshold SNR. For example, the first transmit power may satisfy the threshold SNR (e.g., may be equal to or greater than the threshold SNR) and the second transmit power may fail to satisfy the threshold SNR (e.g., may be less than the threshold SNR). The network entity may use one or more techniques to obtain both the uplink data signal and the SRS. In some examples, the network entity may use the SRS for estimating the uplink channel, or tracking the estimated uplink channel, or both.

Aspects of the subject matter described herein may be implemented to realize one or more of the following potential advantages. For example, the techniques employed by the described communication devices may provide benefits and enhancements to the operation of the communication devices, including improve precoder selection or tracking at a network entity. The operations performed by the described communication devices to improve precoder selection or tracking at the network entity may include transmitting both an SRS and an uplink data signal via a same time and frequency resource. In some examples, operations performed by the described communication devices may also support increased throughput and increased reliability of communications within a wireless communications system, among other benefits.

Aspects of the disclosure are initially described in the context of wireless communications systems. Aspects of the present disclosure are also described in the context of a signal combination scheme, a power diagram, and a process flow. Aspects of the disclosure are further illustrated by and described with reference to apparatus diagrams, system diagrams, and flowcharts that relate to superimposed SRSs on uplink data transmissions.

FIG. 1 shows an example of a wireless communications system 100 that supports superimposed SRSs on uplink data transmissions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a fifth generation (5G) NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support superimposed SRSs on uplink data transmissions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some examples of the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest SNR, or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The wireless communications system 100 may support precoding operations for directional communications. Accordingly, the wireless communications system 100 may also support one or more techniques for selecting a precoder. In accordance with such techniques, a network entity 105 may select a downlink precoder based on channel estimation performed at a UE 115. For example, the network entity 105 may transmit a quantity of downlink reference signals to the UE 115 over a downlink channel. The UE 115 may perform one or more measurements on the downlink reference signals to estimate the downlink channel, and may report the estimated downlink channel to the network entity 105 for selection of a downlink precoder. In some examples, such as for relatively high frequency deployments, the network entity 105 may use an increased quantity of antennas for downlink communications. As such, the network entity 105 may transmit an increased quantity of downlink reference signals to the UE 115 for channel estimation, which may lead to increased overhead and reduced throughput.

In some other examples, the network entity 105 may select a downlink precoder based on channel estimation performed at the network entity 105. For example, the UE 115 may transmit an uplink reference signal, such as an SRS, to the network entity 105 over an uplink channel. The network entity 105 use the SRS to estimate the uplink channel and, under a reciprocity assumption, select a downlink precoder based on the estimated uplink channel. In some examples, however, the UE 115 may refrain from transmitting uplink data signals during time and frequency resources configured for SRS transmissions. Therefore, to maintain a suitable throughput for data communicated between the UE 115 and the network entity 105, the UE 115 may transmit SRSs relatively infrequently. In some examples, relatively infrequent SRS transmissions may lead to relatively infrequent opportunities for channel estimation at the network entity 105, which may degrade downlink precoding at the network entity 105 and, as such, degrade a performance of downlink communications between the UE 115 and the network entity 105.

In some examples, the UE 115 and the network entity 105 may support a framework for superimposing an SRS on an uplink data signal. In such examples, the UE 115 may identify a time and frequency resource allocated to an uplink shared channel. Additionally, the UE 115 may identify a threshold SNR based on the identified time and frequency resource. In some examples, the UE 115 may transmit both an uplink data signal and an SRS via the identified time and frequency resource. As such, the uplink data signal and the SRS may overlap in both time and frequency within the time and frequency resource. In some examples, the UE may transmit the uplink data signal using a first transmit power, and may transmit the SRS using a second transmit power. The first transmit power and the second transmit power may be based on the threshold SNR. For example, the first transmit power may satisfy the threshold SNR and the second transmit power may fail to satisfy the threshold SNR. The network entity 105 may use one or more techniques to obtain both the uplink data signal and the SRS. In some examples, the network entity 105 may use the SRS for estimating the uplink channel, or tracking the estimated uplink channel, or both. In such examples, transmitting both an SRS and an uplink data signal via a same time and frequency resource may improve downlink precoding while maintaining (or improving) throughput, among other benefits.

Figure 2:
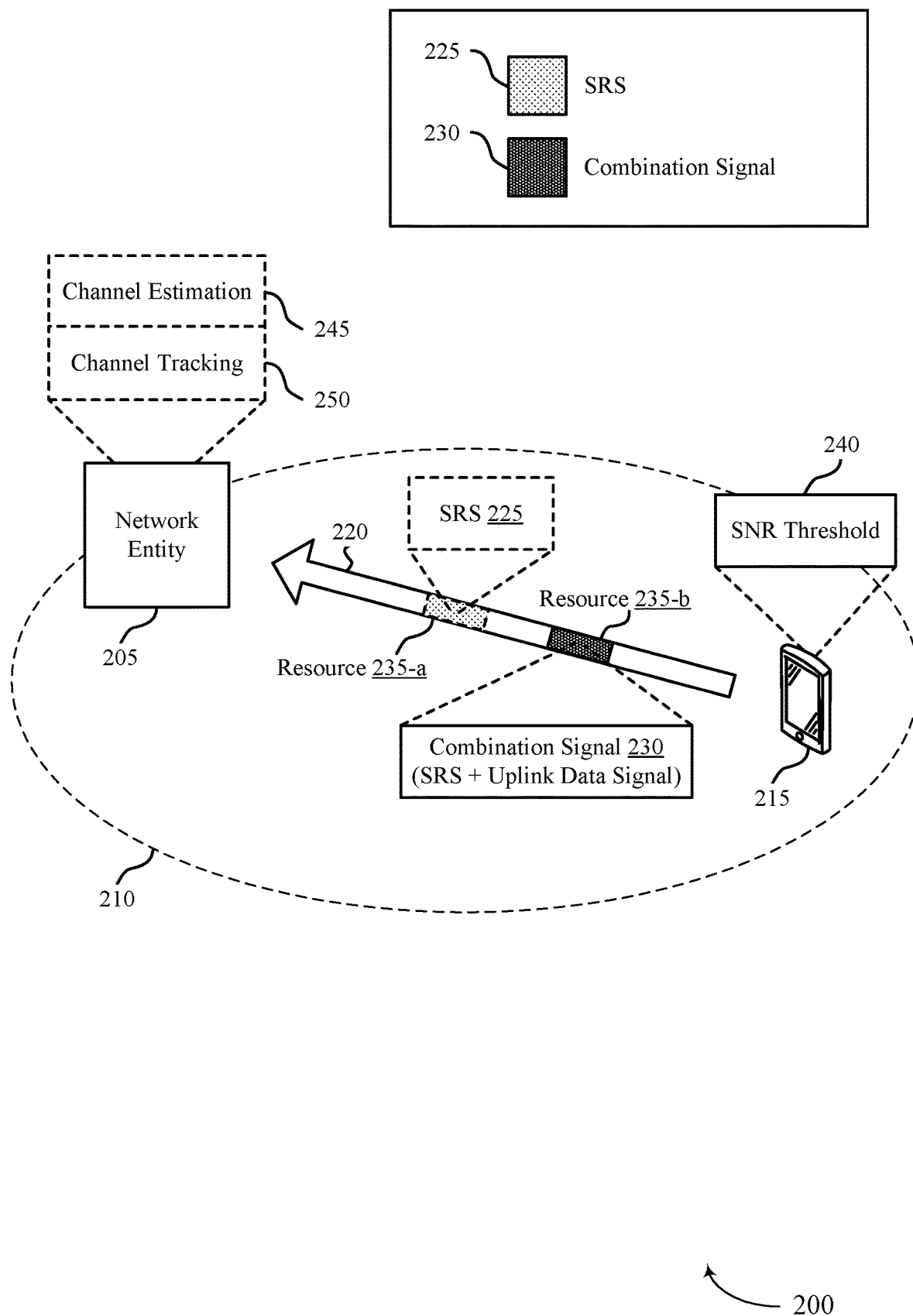

FIG. 2 shows an example of a wireless communications system 200 that supports superimposed SRSs on uplink data transmissions in accordance with one or more aspects of the present disclosure. In some examples, the wireless communications system 200 may implement or be implemented at one or more aspects of the wireless communications system 100. For example, the wireless communications system 200 may include a UE 215, which may be an example of a UE 115 as described with reference to FIG. 1. The wireless communications system 200 may also include a network entity 205, which may be an example of one or more of the network entities 105 (e.g., a CU, a DU, an RU, a base station, an IAB node, or one or more other network nodes) as described with reference to FIG. 1. The network entity 205 and the UE 215 may communicate using a communication link 220, which may be an example of a communication link 125 as described with reference to FIG. 1. For example, the communication link 220 may be an example of an uplink (e.g., a Uu interface). In the example of FIG. 2, the UE 215 and the network entity 205 may communicate within a coverage area 210, which may be an example of a coverage area 110 as described with reference to FIG. 1. The wireless communications system 200 may include features for improved communications between the network entity 205 and the UE 215, among other benefits.

The wireless communications system 200 may support precoding operations for directional communications (e.g., beamforming). For example, wireless communication devices operating within the wireless communications system 200 (e.g., the UE 215, the network entity 205) may communicate via directional transmissions, in which beamforming may be applied to form a beam in a direction. That is, the UE 215 or the network entity 205, or both, may communicate via directional transmissions (e.g., beams), in which beamforming may be applied using one or more antenna elements to form a beam in a direction. In some examples of beamforming (e.g., for digital beamforming), signal processing techniques may be applied by a communication device (e.g., a transmitting communication device, a receiving communication device) to select, shape, or steer a beam (e.g., an antenna, a directional beam) along a spatial path between the communication device and one or more other communication devices. That is, the UE 215 or the network entity 205, or both, may apply beamforming to form a beam (e.g., for directional transmissions or receptions) along a spatial path between the UE 215 and the network entity 205. In some examples of beamforming, the spatial direction of the formed beam may depend on a set of parameters applied by the communication device (e.g., the communication device generating the beam). The set of parameters may be referred to herein as a precoder or a precoding matrix.

The wireless communications system 200 may support one or more techniques for selecting a precoder. For example, the wireless communications system 200 may support one or more techniques for selecting a precoder used at the UE 215 (e.g., a precoder for uplink communications, an uplink precoder) or a precoder used at the network entity 205 (e.g., a precoder used for downlink communications, a downlink precoder), or both. In some examples, the network entity 205 may select a downlink precoder based on channel estimation performed at the UE 215. That is, the network entity 205 may use channel estimation at the UE 215 to determine a precoder for downlink communications between the UE 215 and the network entity 205. In other words, a use for UE channel estimation may include gNB downlink precoding (e.g., singular value decomposition (SVD) precoding. MU-MIMO).

For example, the network entity 205 may transmit a CSI-RS (or another type of downlink reference signal) over a downlink channel to the UE 215. The UE 215 may receive the CSI-RS and may perform one or more measurements to estimate the downlink channel over which the CSI-RS is transmitted. That is, the UE 215 may estimate a downlink channel based on one or more measurements (e.g., reference signal received power (RSRP) measurements, signal-to-interference-plus-noise ratio (SINR) measurements) performed on downlink reference signals (e.g., the CSI-RS) transmitted via the downlink channel. In some examples, the UE 215 may report the estimated downlink channel to the network entity 205. For example, the UE 215 may transmit a report (e.g., a CSI report) to the network entity 205 indicating the estimated downlink channel (e.g., indicating parameters indicative of or otherwise associated with the estimated downlink channel), such that the network entity 205 may select a precoder for downlink transmissions to the UE 215 (e.g., such that the network entity 205 may select a downlink precoder).

In some examples, the network entity 205 may transmit multiple CSI-RSs (e.g., beamformed CSI-RSs) to the UE 215. For example, the UE 215 may receive a quantity of CSI-RS from the network entity 205. The UE 215 may estimate the downlink channel (e.g., one or more properties of the downlink channel) using the quantity of CSI-RSs and may report the estimated downlink channel to the network entity 205 for selection of a downlink precoder. In some examples, the quantity of CSI-RSs (or other type of downlink reference signal) transmitted from the network entity 205 for downlink channel estimation (e.g., at the UE 215) may be based on a quantity of antenna elements at the network entity 205 (e.g., a quantity of antenna elements used at the network entity 205, such as for downlink communications). Additionally, in some examples, the quantity of antenna elements at the network entity 205 (or a quantity of antenna elements used at the network entity 205) may be based on one or more radio frequencies used for wireless communications at the network entity 205.

For example, signals transmitted using relatively high radio frequencies may experience a relatively high path loss. As such, the network entity 205 may be configured to use an increased quantity of antennas (e.g., antenna elements, antenna arrays) to achieve suitable coverage for signals transmitted using relatively high radio frequencies. In some examples, however, using an increased quantity of antennas to transmit CSI-RSs to the UE 215 (e.g., for channel estimation) may lead to increased overhead. That is, in some examples, the network entity 205 may transmit one or more CSI-RSs per antenna at the network entity 205. Accordingly, as the quantity of antennas at the network entity 205 increases the quantity of CSI-RSs transmitted to the UE 215 (e.g., for channel estimation) may also increase, which may lead to increased processing at the UE 215 (e.g., to estimate the downlink channel) or increased signaling overhead (e.g., to report the estimated downlink channel), or both. As such, use of CSI-RSs for downlink channel estimation may be relatively inefficient for some high frequency deployments. In other words, for higher radio frequency bands (e.g., millimeter wave (mmW) bands, sub-terahertz (subTHz) bands, or frequency range 3 (FR3) bands), the network entity 205 (e.g., a gNB) may use a relatively high quantity of transmit antennas. In some examples, a relatively high quantity of transmit antennas may cause CSI-RS-based channel estimation to be relatively impractical (e.g., due to more transmit antennas at the network entity 205 relative to receive antennas at the UE 215).

In some other examples, the network entity 205 may select a downlink precoder based on channel estimation performed at the network entity 205. That is, for some high frequency deployments, such as for NR (e.g., sixth generation (6G)) deployments, the network entity 205 may select a downlink precoder based on uplink channel estimation. For example, the network entity 205 may assume that a downlink channel and an uplink channel (e.g., between the network entity 205 and the UE 215) are reciprocal and, as such, may use uplink channel estimation to determine a downlink precoder. That is, a reciprocity between an uplink channel and a downlink channel may be assumed (e.g., by the UE 215, by the network entity 205), such that the downlink channel (e.g., one or more properties of the downlink channel) may be inferred at the network entity 205 from the uplink channel (e.g., from uplink communications transmitted by the UE 215). In other words, the network entity 205 may infer downlink channel conditions based on measurements performed at the network entity 205 on uplink reference signals (e.g., SRSs). For example, the UE 215 may transmit an SRS over an uplink channel to the network entity 205. The network entity 205 may receive the SRS and use the SRS to measure the uplink channel over which the SRS is transmitted. That is, the UE 215 may transmit SRSs to the network entity 205 to enable the network entity 205 (e.g., the gNB) to do channel estimation for downlink communications (e.g., on the receiver at the UE 215) under the reciprocity assumption. In other words, the network entity 205 may estimate the uplink channel based on measurements (e.g., RSRP measurements, SINR measurements) performed on uplink reference signals transmitted. For example, the network entity 205 may receive the SRS (or another type of uplink reference signal) from the UE 215 via the uplink channel, may estimate the uplink channel based on measurements performed on the SRS, and may select a downlink precoder based on the estimated uplink channel.

In some examples, the UE 215 may use antenna switching to transmit one or more SRS to the network entity 205. In such examples, such SRS transmissions may enable the network entity 205 (e.g., a gNB) to perform channel estimation. That is, under the reciprocity assumption, transmission of SRSs to the network entity 205 may enable the network entity 205 to estimate a channel experienced at the UE receiver. Antenna switching may be a relatively common SRS mode. In some examples of antenna switching, the UE 215 may use multiple antennas to transmit an SRS during (e.g., across) multiple time durations (e.g., symbols, slots). That is, the UE 215 may use multiple antennas to transmit repetitions of an SRS via one or more time and frequency resources that may occur during multiple symbols or multiple slots.

In some examples, the UE 215 may be configured to transmit an SRS via multiple time and frequency resources (e.g., via multiple SRS resources) that occur during multiple symbols within a same slot. For example, the UE 215 may be configured with a first SRS port (e.g., SRS port 0) that may be associated with a first SRS resource that occurs during a first symbol of a slot and a second SRS resource that occurs during a second symbol of the same slot. In such an example, the UE 215 may use a first antenna (e.g., UE antenna port 0) to transmit the SRS during the first symbol and a second antenna (e.g., UE antenna port 1) to transmit the SRS during the second symbol. In some other examples, the UE 215 may be configured with the first SRS port (e.g., SRS port 0) and a second SRS port (e.g., SRS port 1). The first SRS port and the second SRS port may each be associated with the first SRS resource and the second SRS resource. In such an example, the UE 215 may use the first antenna and the second antenna to transmit the SRS during a first symbol. Additionally, the UE 215 may use a third antenna (e.g., UE antenna port 2) and a fourth antenna (e.g., UE antenna port 3) to transmit the SRS during the second symbol.

In some other examples, the UE 215 may be configured to transmit an SRS via SRS resources that occur during multiple symbols across multiple slot. For example, the UE 215 may be configured with the first SRS port (e.g., SRS port 0). The first SRS port may be associated with a first SRS resource, a second SRS resource, a third SRS resource, and a fourth SRS resource. The first SRS resource may occur during a first symbol of a first slot, the second SRS resource may occur during a second symbol of the first slot, the third SRS resource may occur during a third symbol of a second slot, and the fourth SRS resource may occur during a fourth symbol of the second slot. In such an example, the UE 215 may use the first antenna (e.g., UE antenna port 0) to transmit the SRS during the first symbol, the second antenna (e.g., UE antenna port 1) to transmit the SRS during the second symbol, the third antenna (e.g., UE antenna port 2) to transmit the SRS during the third symbol, and the fourth antenna (e.g., UE antenna port 3) to transmit the SRS during the fourth symbol. An antenna used for an SRS transmission during a time duration (e.g., a slot, a symbol) may be based on an association (e.g., mapping) between an SRS port and a UE antenna port associated with the antenna.

In some examples, the UE 215 may be configured to perform antenna switching for aperiodic SRS resources. Additionally, or alternatively, the UE 215 may be configured to perform antenna switching for periodic SRS resources. For example, the UE 215 may be configured with a periodicity at which the UE 215 may transmit an SRS to the network entity 205. In such an example, the UE 215 may select one or more antennas for transmission of the SRS in accordance with the periodicity. In some examples, an antenna used for transmission of the SRS during an SRS resource (e.g., a periodic SRS resource, an aperiodic SRS resource) may be based on an association between one or more SRS ports and one or more UE antenna ports (e.g., corresponding to the antenna).

In some examples, the UE 215 may be configured to refrain from transmitting uplink data signals during time and frequency resources configured for SRS transmissions (e.g., during SRS resources). For example, the UE 215 may be configured to refrain from transmitting signaling via the PUSCH (or receiving signaling via a downlink channel, such as a physical downlink shared channel (the PDSCH) or physical downlink control channel (PDCCH)) during SRS resources. As such, to maintain suitable throughput of data (e.g., of uplink data transmitted via the PUSCH or downlink data transmissions via the PDSCH), a periodicity configured at the UE 215 for SRS transmissions (e.g., a periodicity of the SRS resources) may be relatively low. That is, the UE 215 may be configured to transmit SRSs relatively infrequently. In other words, higher SRS overhead (e.g., more SRS resources) may lower the throughput. As such, the network entity 205 may constrain (e.g., lower, reduce, limit) a periodicity at which the UE 215 may transmit SRSs (e.g., may contain an SRS resource periodicity). However, a relatively low SRS resource periodicity may lead to SRS aging, which may degrade a performance of downlink communications between the network entity 205 and the UE 215. In other words, configuring the UE 215 to transmit SRSs with a relatively low periodicity may lead to relatively infrequent opportunities for channel estimation at the network entity 205 (e.g., using the SRSs). Relatively infrequent channel estimation at the network entity 205 may lead to a downlink precoder (e.g., selected at the network entity 205 based on channel estimation) becoming outdated. An outdated downlink precoder may degrade a performance of downlink communications between the UE 215 and the network entity 205, which may also lower the throughput.

In some examples, one or more techniques for superimposing SRSs on uplink data transmissions, as described herein, may enable the UE 215 to increase a frequency of SRS transmissions, while maintaining (or increasing) throughput. For example, such techniques may provide a framework for superimposing an SRS on an uplink data transmission, which may improve SRS aging and decrease SRS overhead. In other words, techniques for superimposing SRSs on uplink data transmissions, as described herein, may lead to improved SRS aging (which may increase throughput) and decreased SRS overhead (which may also increase the throughput).

As illustrated in the example of FIG. 2, superimposed SRSs may be used (e.g., defined) for relatively high radio frequency bands. For example, the network entity 205 may configure the UE 215 (or the UE 215 may be otherwise configured) to transmit a combination signal 230 to the network entity 205 via the PUSCH. That is, the UE 215 may be configured to transmit an SRS on top of an uplink data signal. In such examples, the UE 215 may identify a resource 235-*b* that may be allocated to an uplink shared channel. That is, the resource 235-*b* may be an example of a time and frequency resource allocated to the PUSCH. For example, the network entity 205 may configure the UE 215 (or the UE 215 may be otherwise configured) with a resource 235-*a* and the resource 235-*b*. The resource 235-*a* may be an example of an SRS resource (e.g., a dedicated resource within a slot configured for SRS transmissions) and the resource 235-*b* may be an example of a PUSCH resource (e.g., a resource allocated to the PUSCH). In some examples, the network entity 205 may configure the UE 215 with the resource 235-*b* (or the resource 235-*a*) via control signaling, such as via downlink control information (DCI), a MAC-control element (MAC-CE), or an RRC message, among other examples of control signaling. In some other examples, the resource 235-*b* or the resource 235-*a*, or both, may be determined (e.g., autonomously) at the UE 215 (e.g., may be pre-configured at the UE 215, may be determined at the UE 215 based on a rule, a mapping, or a periodicity).

The UE 215 may identify an SNR threshold 240 based on the resource 235-*b*. For example, the SNR threshold 240 may correspond to an SNR for decoding uplink data signals transmitted via the PUSCH. In some examples, decoding an uplink data signal may be based on a modulation and coding scheme (MCS) or rank used for transmission of the uplink data signal. As such, the SNR threshold 240 may be based on (e.g., associated with) an MCS or rank used for transmission of an uplink data signal via the resource 235-*b*. For example, the UE 215 may be configured to use an MCS or a rank, or both, for transmission of one or more uplink data signals via the resource 235-*b* (e.g., via the PUSCH). In such an example, the SNR threshold 240 may be based on the MCS, or the rank, or both.

In some examples, the UE 215 may transmit the combination signal 230 (e.g., both an uplink data signal and an SRS) via the resource 235-*b*. In such an example, the uplink data signal and the SRS may overlap in both time and frequency within the resource 235-*b*. That is, the SRS may be superimposed on the uplink data signal within the resource 235-*b*. The UE 215 may transmit the uplink data signal (of the combination signal 230) using a first transmit power. Additionally, the UE 215 may transmit the SRS (of the combination signal 230) using a second transmit power. In some examples, the first transmit power and the second transmit power may be based on the SNR threshold 240. For example, the first transmit power may satisfy the SNR threshold 240 (e.g., may exceed the SNR threshold 240, may be equal to or greater than the SNR threshold 240) and the second transmit power may fail to satisfy (e.g., may fail to exceed the SNR threshold 240, may be below the SNR threshold 240 by some quantity, such as about 10 decibels (dB)). In some examples, the UE 215 may transmit an SRS 225 via the resource 235-*a*. In such examples, the network entity 205 may use the SRS 225 for channel estimation 245 and the combination signal 230 (e.g., the SRS of the combination signal 230) for channel tracking 250. That is, the network entity 205 may use the SRS 225 to estimate the uplink channel and select a downlink precoder (e.g., under the reciprocity assumption). Additionally, the network entity 205 may use the SRS superimposed on the uplink data signal (e.g., the SRS of the combination signal 230) to track the estimated uplink channel and, in some examples, update the selected downlink precoder. In some examples, transmitting the combination signal 230 to the network entity 205 may lead to increased throughput, reduced overhead for SRS transmissions, and improved channel tracking. In other words, superimposing the SRS on the uplink data signal may lead to a relatively higher throughput, relatively less overhead for SRS transmissions, and improved gNB tracking of UE channel estimation (e.g., due to a relatively higher SRS periodicity), among other benefits.

Figure 3:
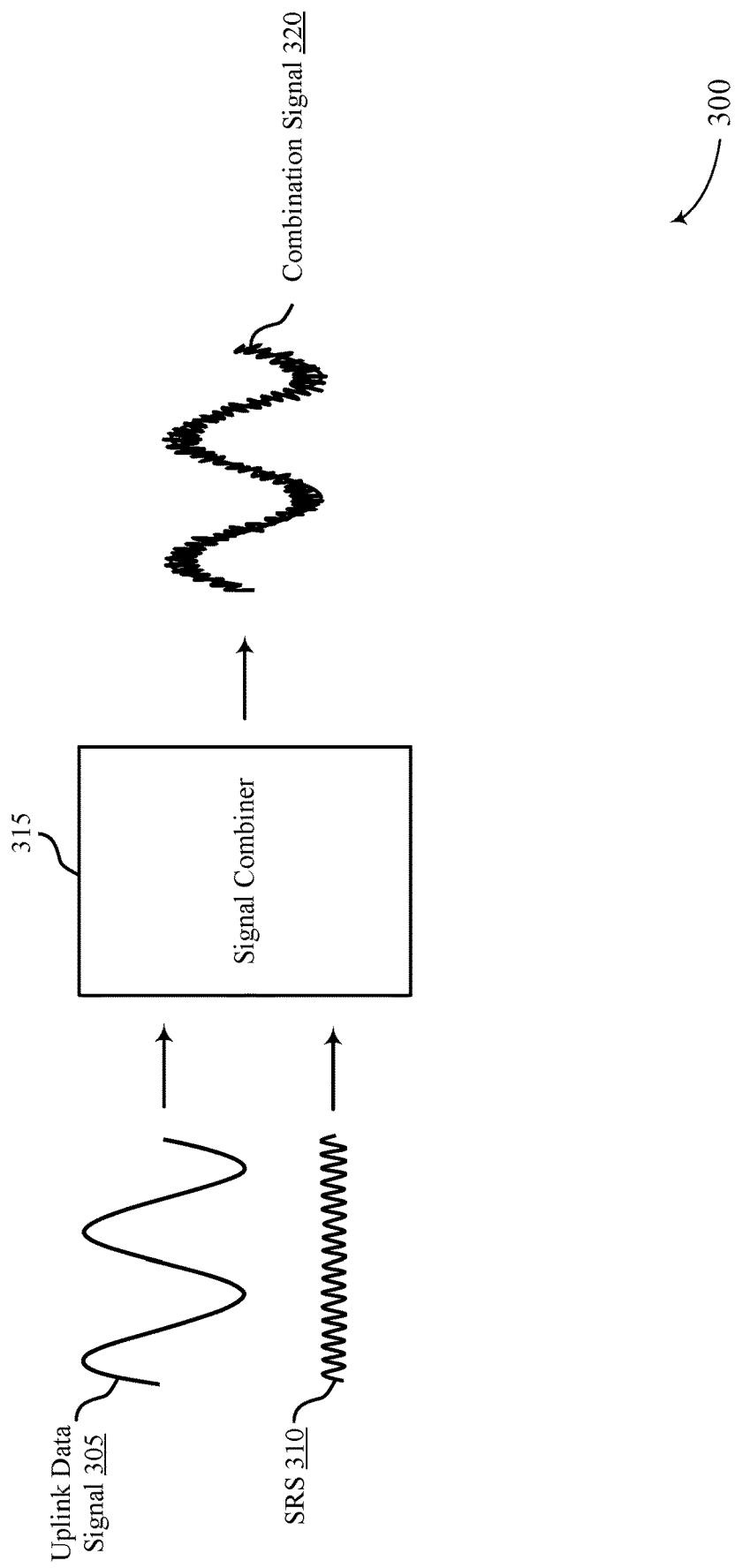
FIG. 3 shows an example of a signal combination scheme that supports superimposed SRSs on uplink data transmissions in accordance with one or more aspects of the present disclosure.

FIG. 3 shows an example of a signal combination scheme 300 that supports superimposed SRSs on uplink data transmissions in accordance with one or more aspects of the present disclosure. In some examples, the signal combination scheme 300 may implement or be implemented at one or more aspects of the wireless communications system 100 and the wireless communications system 200. For example, the signal combination scheme 300 may be implemented at a UE or a network entity, which may be examples of the corresponding devices as described with reference to FIGS. 1 and 2. The signal combination scheme 300 may include features for improved communications between the network entity and the UE, among other benefits.

In some examples, the UE may be configured to multiplex (e.g., in time or in frequency) SRSs with uplink data signals. That is, the UE may multiplex SRSs with uplink data transmitted via PUSCH signaling. For example, the UE may be configured to use different time domain resources or different frequency domain resources, or both, to transmit SRSs and uplink data signals to the network entity. In some examples, however, multiplexing SRSs with uplink data signals, in time or in frequency, may lead to a reduced data rate (e.g., a reduced throughput). For example, the UE may be configured to multiplex SRSs with uplink data signals in time across a set of time domain resources. In such an example, the UE may use a portion of the time domain resources for SRS transmissions and, as such, the UE may not use the portion of time domain resources uplink data transmissions, which may lead to a reduced throughout. Alternatively, the UE may be configured to multiplex SRSs with uplink data signals in frequency across a set of frequency domain resources. In such an example, the UE may use a portion of the frequency domain resources for SRS transmissions and, as such, the UE may not use the portion of frequency domain resources for uplink data transmissions, which may lead to a reduced throughout.

To increased throughput, the UE may determine to reduce the portion of time domain resources or the portion of frequency domain resources used for SRS transmissions such that the UE may transmit SRSs relatively infrequently. However, transmitting SRSs relatively infrequently may lead to relatively infrequent channel estimation at the network entity. Relatively infrequent channel estimation may lead to degraded downlink communications between the network entity and the UE. For example, a downlink precoder selected at the network entity based on channel estimation may become outdated (e.g., over time) and may degrade a performance of downlink communications between the UE and the network entity, which may also lead to a reduced throughput. In some other examples, the UE may be configured to support a framework for superimposing an SRS on an uplink data transmission. For example, in accordance with the framework, the UE may superimpose at least a portion of an SRS on at least a portion of an uplink data signal (e.g., or superimpose at least a portion of an uplink data signal on at least a portion of an SRS).

As illustrated in the example of FIG. 3, the UE may use a signal combiner 315 to superimpose an SRS 310 on an uplink data signal 305. That is, the UE may use a signal combiner 315 to generate (e.g., output) a combination signal 320, which may include the SRS 310 being superimposed (e.g., additively combined with, overlaid on top of) the uplink data signal 305, or vice versa. Although the example of FIG. 3 illustrates the uplink data signal 305 as having a lower frequency than the SRS 310, the uplink data signal 305 may have a higher frequency than the SRS 310 or the uplink data signal 305 may have a same frequency as the SRS 310. Although the example of FIG. 3 illustrates both the uplink data signal 305 and the SRS 310 as sinusoidal waveforms, it is to be understood that one or both may be another type of waveform. The combination signal 320 may be an example of combination signal illustrated by and described with reference to FIG. 2. For example, the UE may identify a time and frequency resource allocated to an uplink shared channel (e.g., the PUSCH) and may transmit the combination signal 320 to the network entity via at least the identified time and frequency resource. That is, the UE may transmit both the SRS 310 and the uplink data signal 305 via a same time and frequency resource that may be allocated to the PUSCH.

In some examples, the UE may use a first transmission power for the uplink data signal 305 and a second transmission power for the SRS 310. The second transmit power may be less than the first transmit power, such that the SRS 310 may not impact a performance of the uplink data signal 305 (e.g., may not impact decoding of the uplink data signal 305 at the network entity). For example, the UE may identify a threshold SNR for transmitting the uplink data signal 305. In some examples, the UE may identify the threshold SNR based on control signaling received from the network entity. That is, the network entity may transmit control signaling (e.g., DCI, a MAC-CE, an RRC message) to the UE that indicates the threshold SNR. In some other examples, the UE may be configured with a set of threshold SNRs (e.g., a table of threshold SNRs) and may identity the threshold SNR from among the set of threshold SNRs. In some examples, the UE may identify the threshold SNR based on the time and frequency resource. For example, the threshold SNR may correspond to an SNR for decoding uplink data signals transmitted via the time and frequency resource.

The UE may transmit the uplink data signal 305 in accordance with the first transmit power, which may satisfy the threshold SNR. For example, the first transmit power may be equal to or greater than the threshold SNR, such that the network entity may decode the uplink data signal 305. Additionally, the UE may transmit the SRS 310 in accordance with the second transmit power, which may fail to satisfy the threshold SNR. For example, the second transmit power may be less than (e.g., about 10 dB less than) the threshold SNR. In such an example, the network entity may use successive interference cancellation (SIC) to receive both the uplink data signal 305 and the SRS 310. For example, the network entity may receive the combination signal 320 and may decode the uplink data signal 305 (e.g., due to the first transmit power being higher than the second transmit power). The network entity may then subtract the uplink data signal 305 from the combination signal 320 to obtain the SRS 310 (e.g., the SRS 310 and noise associated with the combination signal 320). The network entity may then process the SRS 310—for example, the network entity may use the SRS to estimate or track a property of a communication channel (e.g., an uplink channel, a downlink channel) between the UE and the network entity.

In some examples, the UE may transmit the SRS across multiple time and frequency resources. For example, the UE may transmit the SRS via the time and frequency resource and via a second time and frequency resource. In such an example, a processing gain of the SRS 310 (e.g., in time or frequency) across the multiple resources may enable the network entity to use the SRS 310 for channel estimation, channel tracking, or both (e.g., the processing gain may be sufficiently high such that the network entity may use the SRS for channel estimation, channel tracking, or both). That is, the UE may transmit multiple repetitions of the SRS 310 across multiple time and frequency resources that occur within one or more durations (e.g., within a slot or across multiple slots) and the network entity may combine (e.g., jointly process) the multiple repetitions to increase a processing gain of the SRS 310. In some examples, superimposing the SRS 310 on the uplink data signal 305 may lead to an increase in throughout, among other benefits.

Figure 4:
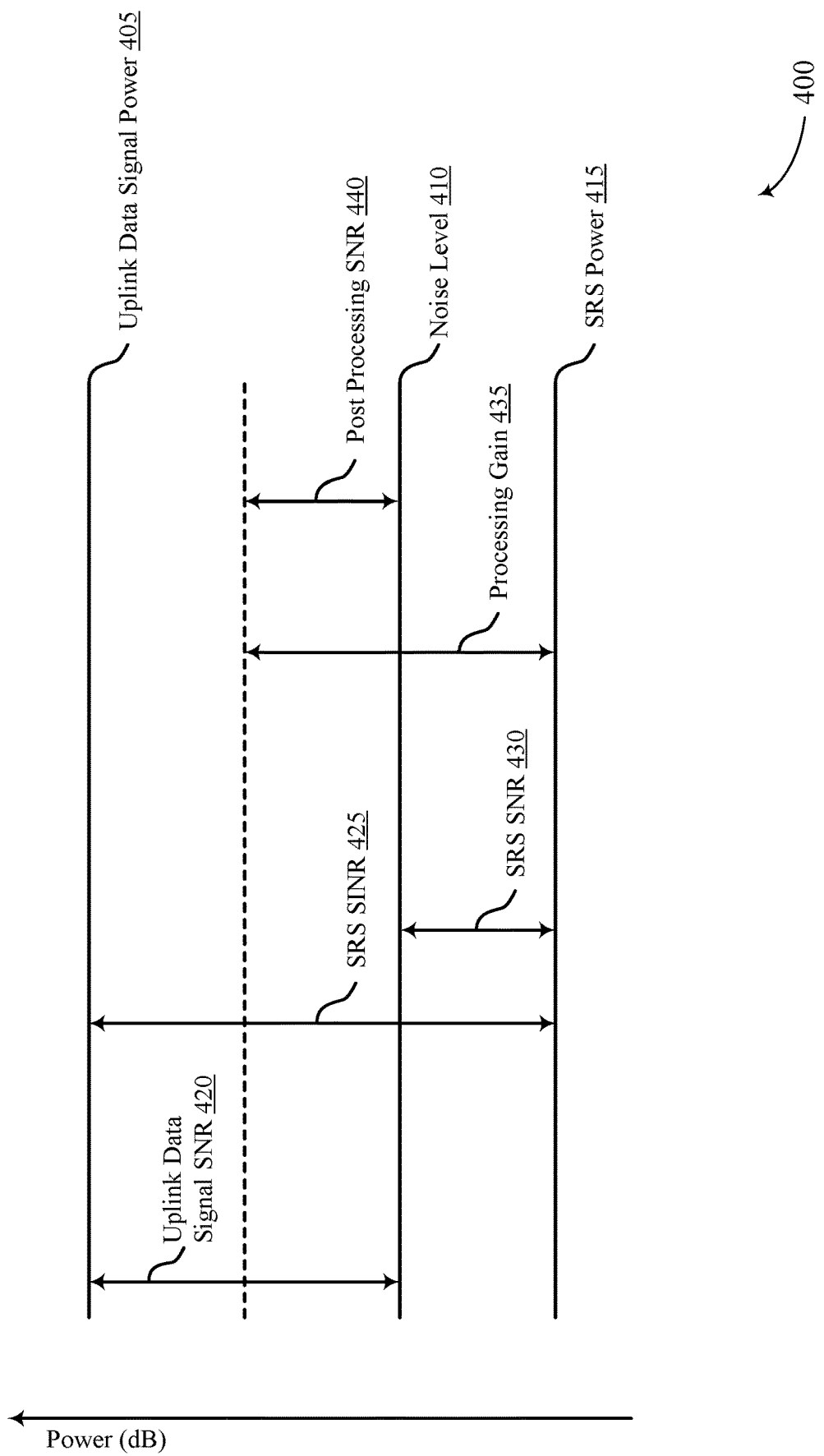
FIG. 4 shows an example of a power diagram that supports superimposed SRSs on uplink data transmissions in accordance with one or more aspects of the present disclosure.

FIG. 4 shows an example of a power diagram 400 that supports superimposed SRSs on uplink data transmissions in accordance with one or more aspects of the present disclosure. In some examples, the power diagram 400 may implement or be implemented at one or more aspects of the wireless communications system 100, the wireless communications system 200, and the signal combination scheme 300. For example, the power diagram 400 may be implemented at a UE or a network entity, which may be examples of the corresponding devices as described with reference to FIGS. 1 through 3. The power diagram 400 may include features for improved communications between the network entity and the UE, among other benefits.

In some examples, the UE and the network entity, may be configured to support a framework for superimposing an SRS on an uplink data signal. As illustrated in the example of FIG. 4, the UE may transmit both an uplink data signal (e.g., a PUSCH data signal) and an SRS to the network entity during a time and frequency resource allocated to an uplink shared channel. That is, during the time and frequency resource, the network entity may receive a combination signal that includes both the uplink data signal and the SRS (e.g., the SRS superimposed on the uplink data signal). The combination signal may be an example of a combination signal illustrated by and described with reference to FIGS. 2 and 2. The UE may transmit the uplink data signal in accordance with an uplink data signal power 405 and may transmit the SRS in accordance with the SRS power 415. A noise associated with the combination signal may be at a noise level 410. That is, a noise associated with the combination signal may correspond to the noise level 410 (e.g., a noise level of the combination signal may be the noise level 410). In some examples, the UE may select the uplink data signal power 405 such that an SNR of the uplink data signal (e.g., an uplink data signal SNR 420) satisfies a threshold SNR for decoding the uplink data signal (e.g., for decoding uplink data signals transmitted via the time and frequency resource). For example, the uplink data signal SNR 420 may be equal to or greater than the threshold SNR for decoding the uplink data signal. In some examples, the UE may transmit the SRS below the uplink data signal SNR 420. As an illustrative example, the SRS power 415 may be about 10 dB below the uplink data signal SNR 420. Accordingly, the SRS power 415 may also be about 10 dB below the noise level 410, and an SRS SINR 425 may be about 10 dB larger than the uplink data signal SNR 420. In the example of FIG. 4, the uplink data signal SNR 420 may be about 30 dB and the SRS SINR 425 may be about −40 dB (e.g., due to the SRS power 415 being about 10 dB below the uplink data signal SNR 420). That is, the SRS power 415 may be about 40 dB below the uplink data signal power 405.

In some examples, the network entity may use SIC to reduce interference between the uplink data signal and the SRS and, as such, improve processing of the SRS (e.g., and therefore improved channel estimation on the SRS). For example, the network entity may decode the uplink data signal (e.g., based on the uplink data signal power 405 satisfying the threshold SNR). The network entity may then cancel the decoded uplink data signal to obtain the SRS. For example, the network entity may subtract the decoded uplink data signal from the combination signal (e.g., the received signal including both the uplink data signal and the SRS). In some examples, an SNR of the SRS after the network entity cancels the uplink data signal from the combination signal may be an SRS SNR 430. That is, the SRS SNR 430 may correspond to an SNR of the SRS after SIC. In the example of FIG. 4, the SRS SNR 430 may be about −10 dB (e.g., due to the SRS power 415 being about 10 dB below the noise level 410).

In some examples, the UE may transmit the SRS via the time and frequency resource and via one or more other time and frequency resources. That is, the UE may transmit multiple repetitions (e.g., multiple instances) of the SRS via multiple time and frequency resources. In such an example (e.g., due to the SRS being a known sequence to the network entity) the network entity may combine (e.g., jointly process) the multiple SRS transmissions. That is, the SRS being a known signal to the network entity and, as such, the network entity may collect (e.g., combine) the power of the SRS across multiple frequency domain resources (e.g., across a bandwidth used for the SRS repetitions) or across multiple time domain resources (e.g., across multiple symbols), or both. In some examples, such as examples in which the network entity may combine (e.g., add) the power of the SRS across multiple symbols (e.g., OFDM symbols or some other suitable duration), the symbols may occur in a same slot or in multiple (e.g., different) slots. As an illustrative example, the UE may transmit the SRS across 10 time and frequency resources in which a time and frequency resources includes a symbol and a subcarrier. In other words, the UE may transmit the SRS across 10 resource elements. In such an example, the network entity may combine (e.g., add) the power of the SRS across the 10 symbols, the 10 subcarriers, or both. In some examples, by combining the SRS across the 10 resource elements (e.g., the 10 symbols, the 10 subcarriers) the network entity may increase a processing gain of the SRS to a processing gain 435. That is, the processing gain 435 may correspond to the processing gain of the SRS. Accordingly, the network entity may increase an SNR of the SRS to a post processing SNR 440. In other words, a post processing SNR obtained (e.g., achieved) at the network entity for the SRS may correspond to the post processing SNR 440. In the example of FIG. 4, the processing gain 435 may be about 20 dB and, as such, the post processing SNR 440 may be about +10 dB. That is, the post processing SNR 440 may be about 10 dB above the noise level 410. In some examples, the post processing SNR 440 may be suitable for channel tracking. In other words, the post processing SNR obtained (e.g., achieved) at the network entity for the SRS may be suitable for channel tracking. As such, the network entity may use the SRS for channel tracking, which may lead to improved downlink precoder selection at the network entity, among other benefits.

Figure 5:
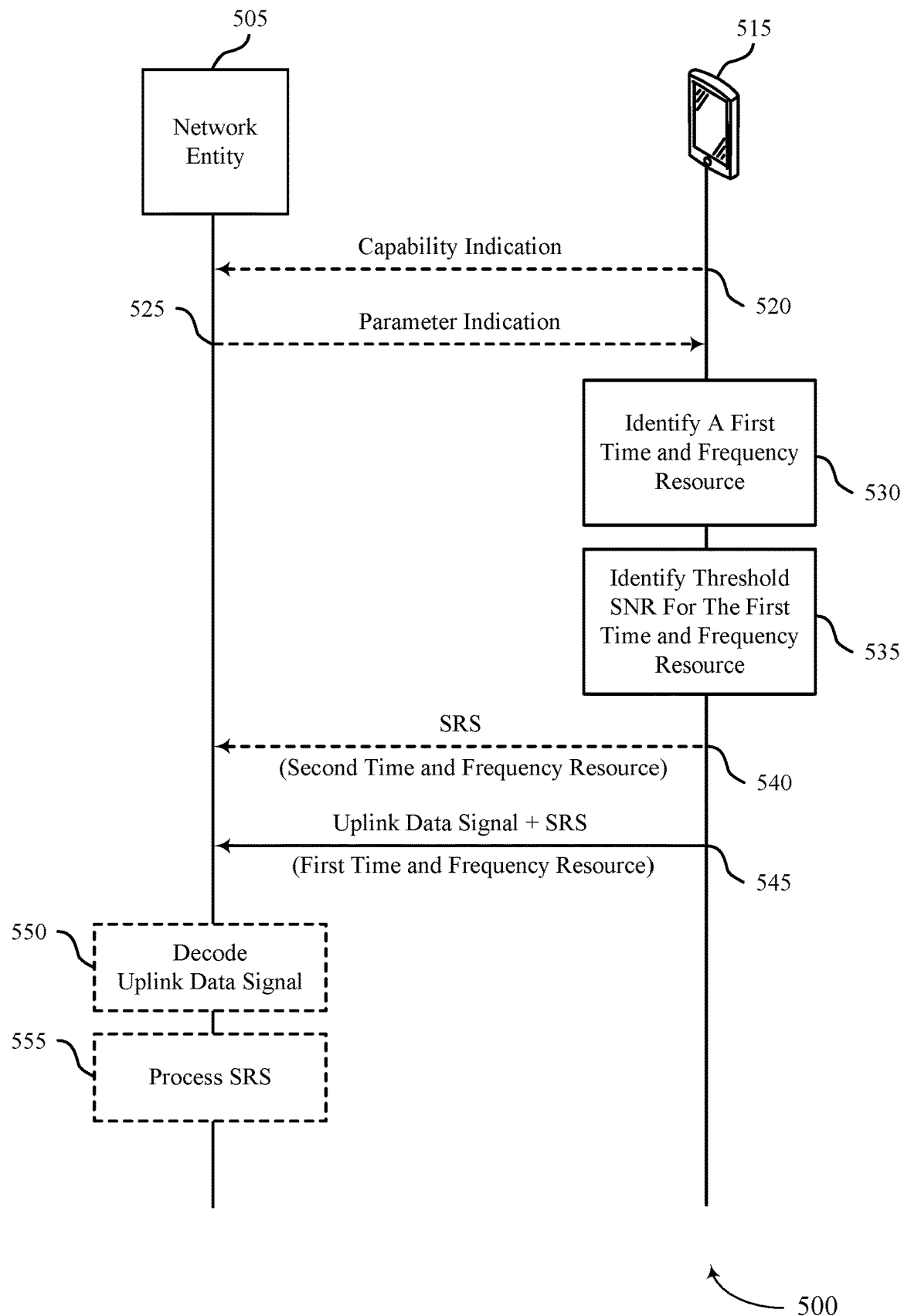
FIG. 5 shows an example of a process flow that supports superimposed SRSs on uplink data transmissions in accordance with one or more aspects of the present disclosure.

FIG. 5 shows an example of a process flow 500 that supports superimposed SRSs on uplink data transmissions in accordance with one or more aspects of the present disclosure. The process flow 500 may implement or be implemented at one or more aspects the wireless communications system 100, the wireless communications system 200, the signal combination scheme 300, and the power diagram 400. For example, the process flow 500 may include operations at a UE 515 and a network entity 505, which may be examples of the corresponding devices as described with reference to FIGS. 1 through 4. In the following description of the process flow 500, the operations between the UE 515 and the network entity 505 may occur in a different order than the example order shown. Additionally, or alternatively, the operations performed by the UE 515 and the network entity 505 may be performed in different orders or at different times. Some operations may also be omitted or combined. The operations performed by the network entity 505 and the UE 515 may support improvements to communications between the UE 515 and the network entity 505, among other benefits.

The UE 515 and the network entity 505 may be configured to support a framework for superimposing an SRS on an uplink data transmission (e.g., a PUSCH data transmission). That is, the SRS may be transmitted as a superimposed signal on a PUSCH data transmission from the UE 515. In other words, the UE 515 may transmit an SRS with a PUSCH data transmission (e.g., with each PUSCH data transmission or with a portion of PUSCH data transmissions) to the network entity 505. As illustrated in the example of FIG. 5, the UE 515 may identify a resource allocation for transmitting PUSCH data to the network entity 505 and the SRS may be overlaid over the PUSCH data using the same resource allocation.

At 530, the UE 515 may identify a first time and frequency resource allocated to an uplink shared channel (e.g., the PUSCH). For example, the UE 515 may receive control signaling (e.g., DCI, a MAC-CE, an RRC message) from the network entity 505 indicating the first time and frequency resource or the UE 515 may be otherwise configured with the first time and frequency resource. The time and frequency resource may be an example of a time and frequency resource described with reference to FIG. 4. For example, the time and frequency resource may be an example of a resource element.

At 535, the UE 515 may identify a threshold SNR for the first time and frequency resource. The threshold SNR may be an example of a threshold SNR illustrated by and described with reference to FIGS. 2 through 4. For example, the threshold SNR may be based on an SNR associated with decoding PUSCH data (e.g., an uplink data signal) via the time and frequency resource. That is, the threshold SNR may be associated with the time and frequency resource. For example, the threshold SNR may be based on an MCS associated with the first time and frequency resource, or a rank associated with the first time and frequency resource, or both. In some examples, the network entity 505 (e.g., a gNB) may know (e.g., determine) the MCS and the rank for one or more PUSCH transmissions via the first time and frequency resource (or via one or more other resources allocated to the PUSCH). Additionally, the network entity 505 may know (e.g., determine) the threshold SNR for decoding PUSCH transmissions (e.g., unicast PUSCH transmissions) via the first time and frequency resource (or via one or more other resources allocated to the PUSCH). As such, the network entity 505 may signal (e.g., indicate) the threshold SNR to the UE 515. For example, the UE 515 may receive control signaling (e.g., via the PDSCH or via the PDCCH) from the network entity 505 that indicates the threshold SNR. For example, the control signaling may be in the form of one or more DCI messages, one or more MAC-CEs, or one or more RRC messages, among other possible types of control signaling, that indicates the threshold SNR. In some other examples, the threshold SNR may be determined (e.g., predefined, preconfigured) at the UE 515. For example, the UE 515 may be configured with a table of threshold SNRs (e.g., a set of one or more SNRs) and a threshold SNR (e.g., each threshold SNR) included in the table may correspond to a respective MCS, or a respective rank, or both. As such, the UE 515 may determine an MCS associated with the time and frequency resource, or a rank associated with the time and frequency resource, or both. The UE 515 may identify, from among the set of threshold SNRs, the threshold SNR for the time and frequency resource (e.g., based on the determined MCS or rank).

At 545, the UE 515 may transmit both an uplink data signal (e.g., PUSCH data) and an SRS via at least the first time and frequency resource. For example, the UE 515 may transmit a combination signal via at least the time and frequency resource, in which the combination signal includes both the uplink data signal and the SRS. In other words, the UE 515 may transmit the uplink data signal and the SRS such that at least a portion of the SRS is superimposed upon at least a portion of the uplink data signal within the time and frequency resource, or at least a portion of the uplink data signal is superimposed upon at least a portion of the SRS within the time and frequency resource. As such, the uplink data signal and the SRS may overlap in both time and frequency within the first time and frequency resource. In some examples, the uplink data signal and the SRS overlapping in both time and frequency within the time and frequency resource may be based on a capability of the UE 515.

In some cases, for example, at 520, the UE 515 may transmit an uplink message that indicates a capability of the UE 515 to transmit SRSs via time and frequency resources allocated to the uplink shared channel. In other words, the UE 515 may transmit an uplink message that indicates a capability of the UE 515 to superimpose an SRS on an uplink data signal. In some examples, the UE 515 may transmit the uplink message as part of a handshake protocol between the UE 515 and the network entity 505. In such an example, the uplink message may indicate the capability of the UE 515 to superimpose the SRS on the uplink data signal and one or more other capabilities of the UE 515.

A signal strength of the SRS may be lower (e.g., much lower) than a signal strength of the uplink data signal (e.g., the PUSCH data). For example, a transmit power used at the UE 515 to transmit the SRS may be lower than a transmit power used at the UE 515 to transit the uplink data signal. As such, the signal strength of the SRS may be lower than the signal strength of the uplink data signal and, therefore, the received power of the SRS at the network entity 505 may be lower than the received power of the uplink data signal at the network entity 505.

In some examples, the transmit power used at the UE 515 to transmit the uplink data signal, and the transmit power used at the UE 515 to transmit the SRS, may be based on the threshold SNR. For example, the transmit power used at the UE 515 for the uplink data signal may satisfy the threshold SNR (e.g., may be equal to or greater than the threshold SNR) and the second transmit power may fail to satisfy the threshold SNR (e.g., may be less than the threshold SNR). That is, the SRS may be transmitted with a transmit power that may be below (e.g., about 10 dB or some other suitable quantity of power below) the threshold SNR for decoding the uplink data signal (e.g., such that the SRS may not impact a performance of the uplink data signal). In some examples, an SINR of the SRS may be negative (e.g., about −40 dB or some other suitable quantity of power). In such an example, interference contributing to the SINR may be due to the uplink data signal. In some examples, transmitting the uplink data signal and the sounding reference signal via the time and frequency resource may be in accordance with one or more parameters.

For example, at 525, the UE 515 may receive an indication of a superimposed SRS configuration that includes a parameter indication from the network entity 505. That is, the UE 515 may receive an indication of one or more parameters for transmission of SRSs via time and frequency resources allocated to the uplink shared channel (e.g., including the first time and frequency resource). The one or more parameters may include a periodicity associated with the transmission of SRSs via time and frequency resources allocated to the uplink shared channel, or the threshold SNR, or both, among other examples of parameters that may be used at the UE 515 for transmission of SRSs via uplink shared channel resources (e.g., PUSCH resources). For example, signaling that indicates the one or more parameters may include control signaling (e.g., DCI, a MAC-CE, an RRC message) that indicates the threshold SNR. In some examples, the signaling may include PDSCH signaling or PDCCH signaling. Additionally, or alternatively, the signaling that indicates the one or more parameters may include control signaling (e.g., DCI, a MAC-CE, an RRC message) that indicates a periodicity at which the UE 515 may transmit SRSs to the network entity 505 via time and frequency resources allocated to the PUSCH (e.g., a frequency at which the UE 515 may superimpose SRS on PUSCH data transmissions). In some examples, a first periodicity at which the UE 515 may transmit SRSs via time and frequency resources allocated to the PUSCH may be different from (or the same as) a second periodicity at which the UE 515 may transmit SRSs via time and frequency resources not allocated to the uplink shared channel (e.g., via time and frequency resources unassociated with PUSCH data transmissions).

For example, at 540, the UE 515 may transmit a second SRS to the network entity 505 via a second time and frequency resource. In such an example, the time and frequency resource used for transmission of the SRS that is superimposed on the uplink data signal may be based on the first periodicity and the second time and frequency resource may be based on the second periodicity. In some examples, the second periodicity may be lower than (or higher than) the first periodicity. For example, the UE 515 may transmit the second SRS in accordance with (e.g., using) a transmit power that may be higher than the transmit power used at the UE 515 to transmit the SRS superimposed on the uplink data signal. In such an example, the second SRS may be usable at the network entity 505 for channel estimation and the SRS superimposed on the uplink data signal may be usable at the network entity 505 for tracking the estimated channel. That is, reference signals with a relatively high received power may be suitable for channel estimation (e.g., with relatively high accuracy) and reference signals with a relatively low received power may be suitable for channel tracking. As such, the network entity 505 may use the second SRS for channel estimation and the SRS superimposed on the uplink data signal for tracking the estimation channel. In some examples, the first periodicity and the second periodicity may be adjusted (e.g., dynamically) based on channel conditions. For example, the network entity 505 may determine to estimate the channel (e.g., estimate one or more properties of the channel) more frequently or less frequently (e.g., based on one or more observations at the network entity 505, such as an observed quality of uplink signaling from the UE 515). As such, the network entity 505 may determine to adjust (e.g., increase or decrease) the second periodicity. Additionally, or alternatively, the network entity 505 may determine to track the channel (e.g., track one or more properties of the channel) more frequently or less frequently (e.g., based on one or more observations at the network entity 505, such as an observed quality of uplink signaling from the UE 515). As such, the network entity 505 may determine to adjust (e.g., increase or decrease) the first periodicity. In some other examples, the UE 515 may determine (e.g., autonomously) to adjust the first periodicity or the second periodicity (e.g., based on one or more observations at the UE 515, such as an observed quality of downlink signaling from the network entity 505).

In some examples, at 550, the network entity 505 may decode the uplink data signal. For example, the network entity 505 (e.g., a gNB) may decode the uplink data signal (e.g., the PUSCH) and subtract the decoded uplink data signal (e.g., the known data) from the received signal to receive the SRS signal. That is, the network entity 505 may use SIC to decode the uplink data signal and subtract the decoded uplink data signal from the received signal to obtain the SRS signal. In other words, the network entity 505 may use SIC to receive both the SRS and the uplink data signal. For example, the network entity 505 may receive the combination signal, which includes the uplink data signal and the SRS. The network entity 505, may decode the uplink data signal and may subtract (e.g., cancel) the decoded uplink data signal (e.g., the known data) from the received combination signal to obtain the SRS signal. In some examples, decoding the uplink data signal at 550 may be based on a received power (or the transmit power) of the uplink data signal satisfying the threshold SNR.

In some examples, at 555, the network entity 505 may process the SRS based on decoding the uplink data signal (e.g., and subtracting the uplink data signal from the received combination signal). For example, an SNR of the SRS after SIC (e.g., after subtracting the decoded uplink data signal from the received combination signal) may be less than the SINR of the SRS before SIC (e.g., the post SIC SNR of the SRS may be about −10 dB). In some examples, the SNR of the SRS after SIC (e.g., the post SIC SNR of the SRS) may be suitable (e.g., sufficiently high) for processing the SRS. That is, the SNR of the SRS after SIC may be suitable for channel estimation using the SRS, or for channel tracking using the SRS, or both.

In some examples, such as examples in which an SNR of PDSCH signaling from the network entity 505 may be relatively high (e.g., for relatively high PDSCH SNR scenarios) precoding at the network entity 505 may impact downlink transmissions. In such examples, it may be desirable to increase a performance of channel estimation using SRSs (e.g., to improve downlink precoder selection at the network entity 505). The UE 515 may determine to transmit multiple repetitions (e.g., multiple instances) of the SRS across multiple time and frequency resources. For example, the UE 515 may transmit the SRS across multiple resource elements (e.g., about 10 resource elements or some other suitable quantity of resource elements). In such an example, the network entity 205 may obtain an SRS processing gain that may be suitable for updating the precoding (e.g., may be sufficiently high, may be about 20 dB or some other suitable quantity of power). That is, the UE 515 may transmit the SRS in multiple resource elements (e.g., in each of the 10 resource elements) such that the network entity 505 may obtain a relatively large processing gain for channel estimation (e.g., for precoder selection) or for channel tracking (e.g., for updating the precoder). For example, the network entity 505 may increase the SRS processing gain by combining (e.g., jointly processing) the SRS across multiple resource elements (e.g., across 10 OFDM symbols). In some examples, processing the SRS may be based on a processing gain of the SRS (in time or in frequency) across multiple time and frequency resources satisfying a threshold processing gain. In other words, processing the SRS may be based on a combined received power of the SRS (in time or in frequency) across multiple time and frequency resources satisfying a threshold SNR for processing SRSs. The multiple time and frequency resources may occur within a same slot or across (e.g., between) multiple slots. In some examples, by superimposing the SRS on the uplink data signal, the UE 515 may decrease SRS aging (e.g., decrease channel estimation aging, thereby reducing a likelihood of the precoding becoming outdated), which may improve a performance of downlink communications between the network entity 505 and the UE 515 (e.g., by enable the network entity 505 to update the downlink precoder), among other benefits.

Figure 6:
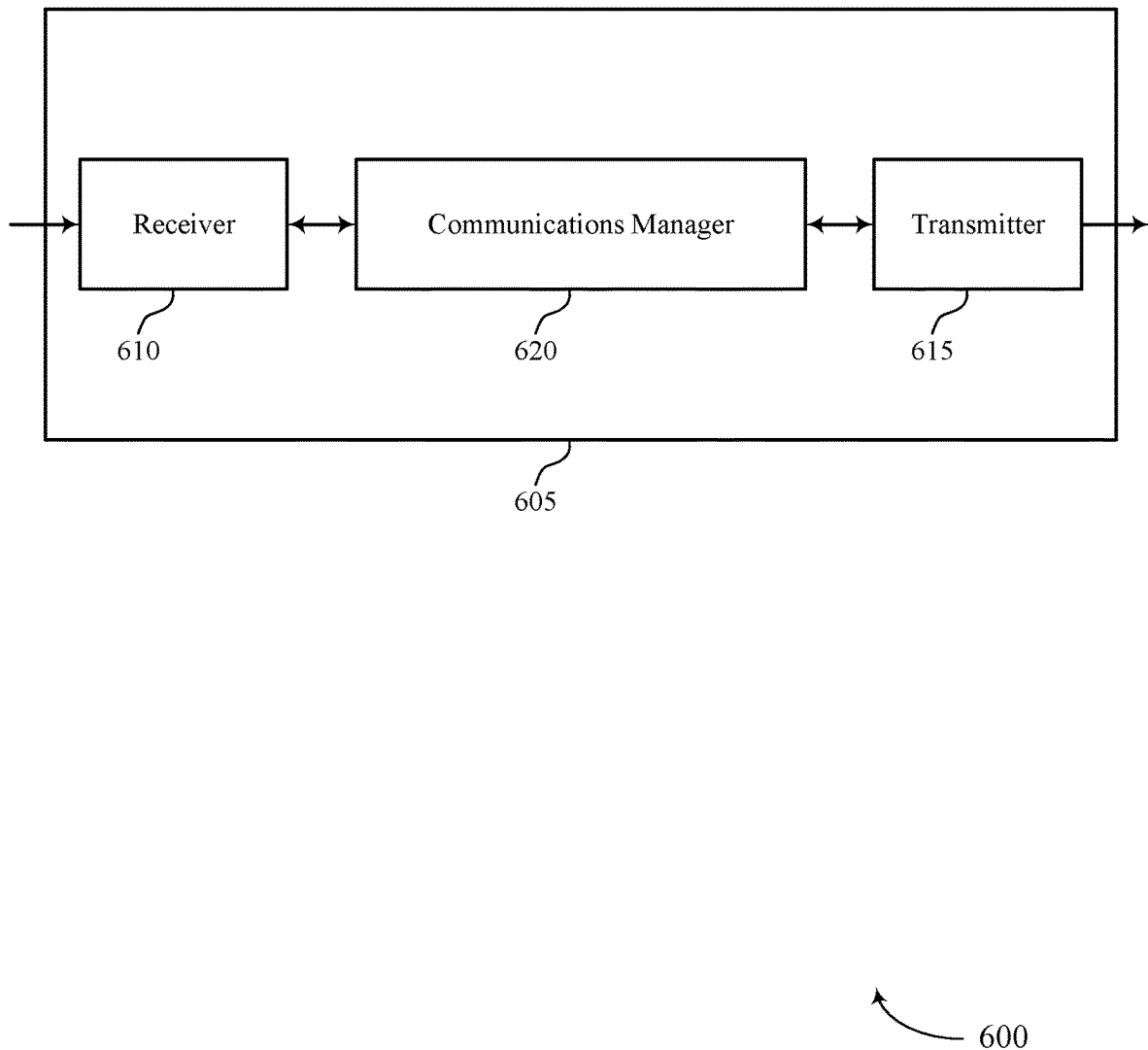
FIGS. 6 and 7 show block diagrams of devices that support superimposed SRSs on uplink data transmissions in accordance with one or more aspects of the present disclosure.

FIG. 6 shows a block diagram 600 of a device 605 that supports superimposed SRSs on uplink data transmissions in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to superimposed SRSs on uplink data transmissions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to superimposed SRSs on uplink data transmissions). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of superimposed SRSs on uplink data transmissions as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by executing, by the at least one processor, instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE (e.g., the device 605) in accordance with examples as disclosed herein. For example, the communications manager 620 is capable of, configured to, or operable to support a means for identifying a time and frequency resource allocated to an uplink shared channel. The communications manager 620 is capable of, configured to, or operable to support a means for identifying a threshold SNR associated with the time and frequency resource. The communications manager 620 is capable of, configured to, or operable to support a means for transmitting both an uplink data signal and an SRS via at least the time and frequency resource, where the uplink data signal and the SRS overlap in both time and frequency within the time and frequency resource, and where the uplink data signal is transmitted using a first transmit power and the SRS is transmitted using a second transmit power, the first transmit power and the second transmit power based on the threshold SNR.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for more efficient utilization of communication resources.

Figure 7:
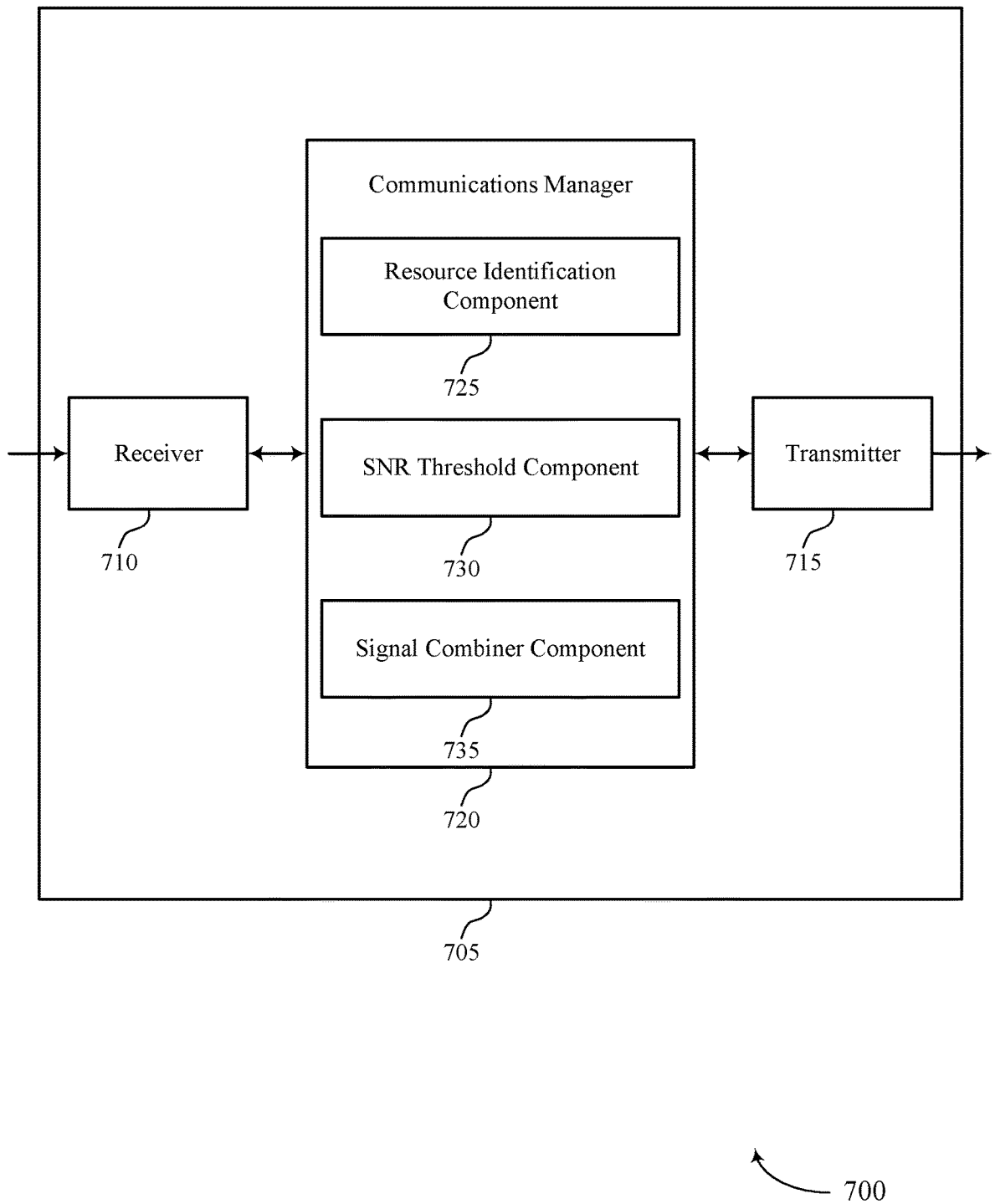

FIG. 7 shows a block diagram 700 of a device 705 that supports superimposed SRSs on uplink data transmissions in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, and the communications manager 720), may also include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to superimposed SRSs on uplink data transmissions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to superimposed SRSs on uplink data transmissions). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of superimposed SRSs on uplink data transmissions as described herein. For example, the communications manager 720 may include a resource identification component 725, an SNR threshold component 730, a signal combiner component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE (e.g., the device 705) in accordance with examples as disclosed herein. The resource identification component 725 is capable of, configured to, or operable to support a means for identifying a time and frequency resource allocated to an uplink shared channel. The SNR threshold component 730 is capable of, configured to, or operable to support a means for identifying a threshold SNR associated with the time and frequency resource. The signal combiner component 735 is capable of, configured to, or operable to support a means for transmitting both an uplink data signal and an SRS via at least the time and frequency resource, where the uplink data signal and the SRS overlap in both time and frequency within the time and frequency resource, and where the uplink data signal is transmitted using a first transmit power and the SRS is transmitted using a second transmit power, the first transmit power and the second transmit power based on the threshold SNR.

Figure 8:
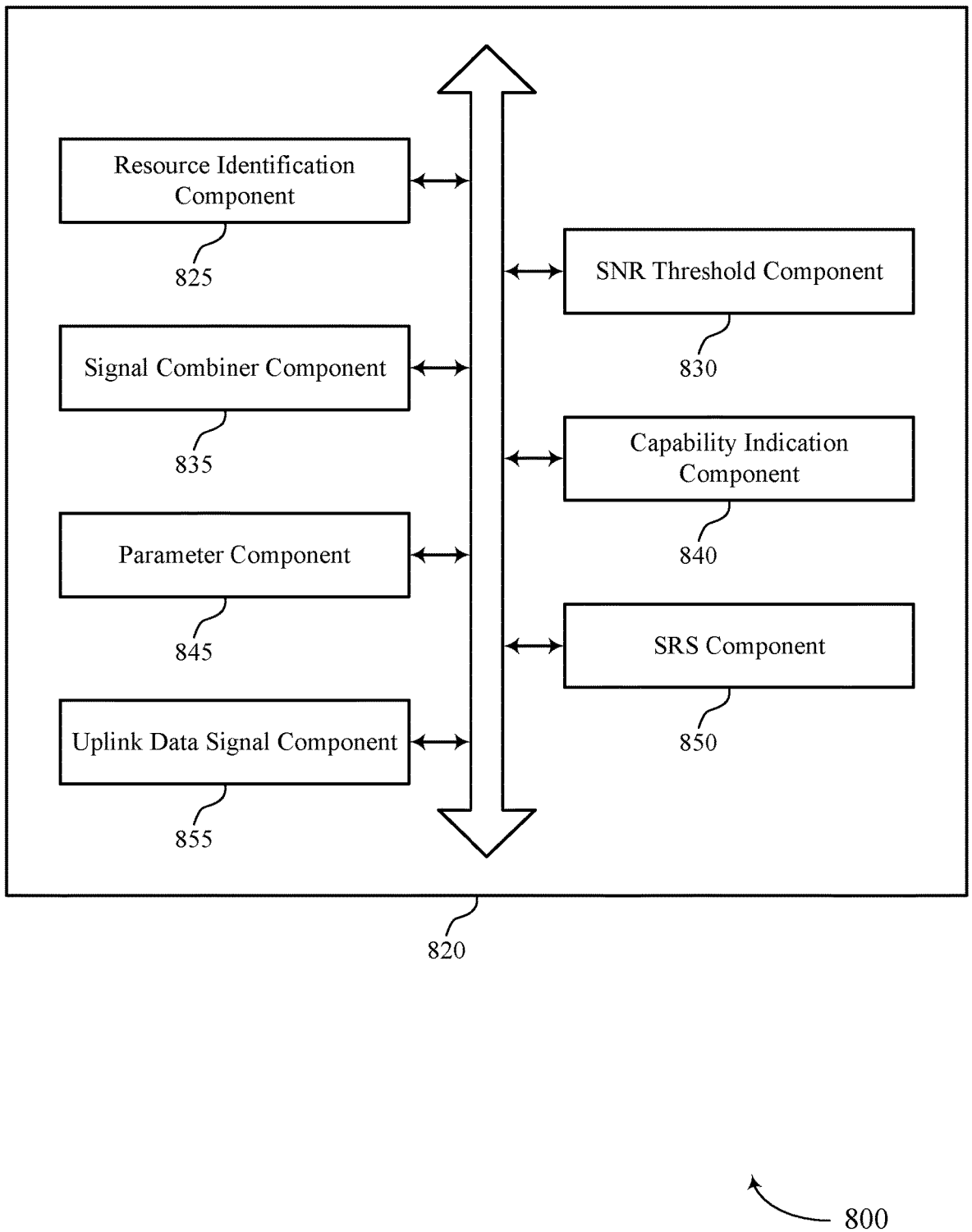
FIG. 8 shows a block diagram of a communications manager that supports superimposed SRSs on uplink data transmissions in accordance with one or more aspects of the present disclosure.

FIG. 8 shows a block diagram 800 of a communications manager 820 that supports superimposed SRSs on uplink data transmissions in accordance with one or more aspects of the present disclosure. The communications manager 820 may be an example of aspects of a communications manager 620, a communications manager 720, or both, as described herein. The communications manager 820, or various components thereof, may be an example of means for performing various aspects of superimposed SRSs on uplink data transmissions as described herein. For example, the communications manager 820 may include a resource identification component 825, an SNR threshold component 830, a signal combiner component 835, a capability indication component 840, a parameter component 845, an SRS component 850, an uplink data signal component 855, or any combination thereof. Each of these components, or components of subcomponents thereof (e.g., one or more processors, one or more memories), may communicate, directly or indirectly, with one another (e.g., via one or more buses).

The communications manager 820 may support wireless communications at a UE in accordance with examples as disclosed herein. The resource identification component 825 is capable of, configured to, or operable to support a means for identifying a time and frequency resource allocated to an uplink shared channel. The SNR threshold component 830 is capable of, configured to, or operable to support a means for identifying a threshold SNR associated with the time and frequency resource. The signal combiner component 835 is capable of, configured to, or operable to support a means for transmitting both an uplink data signal and an SRS via at least the time and frequency resource, where the uplink data signal and the SRS overlap in both time and frequency within the time and frequency resource, and where the uplink data signal is transmitted using a first transmit power and the SRS is transmitted using a second transmit power, the first transmit power and the second transmit power based on the threshold SNR.

In some examples, to support transmitting both the uplink data signal and the SRS, the signal combiner component 835 is capable of, configured to, or operable to support a means for transmitting a combination signal via at least the time and frequency resource, where the combination signal includes the uplink data signal and the SRS.

In some examples, to support transmitting the combination signal, the uplink data signal component 855 is capable of, configured to, or operable to support a means for transmitting the uplink data signal via the time and frequency resource. In some examples, to support transmitting the combination signal, the SRS component 850 is capable of, configured to, or operable to support a means for transmitting the SRS via the time and frequency resource and at least a second time and frequency resource that is also allocated to the uplink shared channel.

In some examples, at least a portion of the SRS is superimposed upon at least a portion of the uplink data signal within the time and frequency resource. In some examples, at least a portion of the uplink data signal is superimposed upon at least a portion of the SRS within the time and frequency resource.

In some examples, the capability indication component 840 is capable of, configured to, or operable to support a means for transmitting an uplink message that indicates a capability of the UE to transmit SRSs via time and frequency resources allocated to the uplink shared channel, where the uplink data signal and the SRS overlapping in both time and frequency within the time and frequency resource is based on the capability.

In some examples, the parameter component 845 is capable of, configured to, or operable to support a means for receiving an indication of one or more parameters for transmission of SRSs via time and frequency resources allocated to the uplink shared channel, where transmitting the uplink data signal and the SRS via the time and frequency resource is in accordance with the one or more parameters.

In some examples, the one or more parameters include a periodicity associated with the transmission of SRSs via time and frequency resources allocated to the uplink shared channel, or the threshold SNR, or both. In some examples, the SRS component 850 is capable of, configured to, or operable to support a means for transmitting, via a second time and frequency resource, a second SRS using a third transmit power that is higher than the second transmit power.

In some examples, the time and frequency resource is based on a first periodicity that is associated with transmission of SRSs via time and frequency resources allocated to the uplink shared channel. In some examples, the second time and frequency resource is based on a second periodicity that is associated with transmission of SRSs via time and frequency resources not allocated to the uplink shared channel. In some examples, the second periodicity is lower than the first periodicity.

In some examples, the second SRS is usable at a network entity for estimating a property of a downlink channel between the UE and the network entity. In some examples, the SRS is usable at the network entity for tracking the property. In some examples, to support identifying the threshold SNR, the SNR threshold component 830 is capable of, configured to, or operable to support a means for receiving control signaling that indicates the threshold SNR. In some examples, the control signaling includes DCI, a MAC-CE, or an RRC message.

In some examples, to support identifying the threshold SNR, the SNR threshold component 830 is capable of, configured to, or operable to support a means for identifying, from among a set of threshold SNRs, the threshold SNR based on the time and frequency resource. In some examples, the threshold SNR is based on an MCS associated with the time and frequency resource, or a rank associated with the time and frequency resource, or both. In some examples, the threshold SNR is based on an SNR associated with decoding the uplink data signal.

Figure 9:
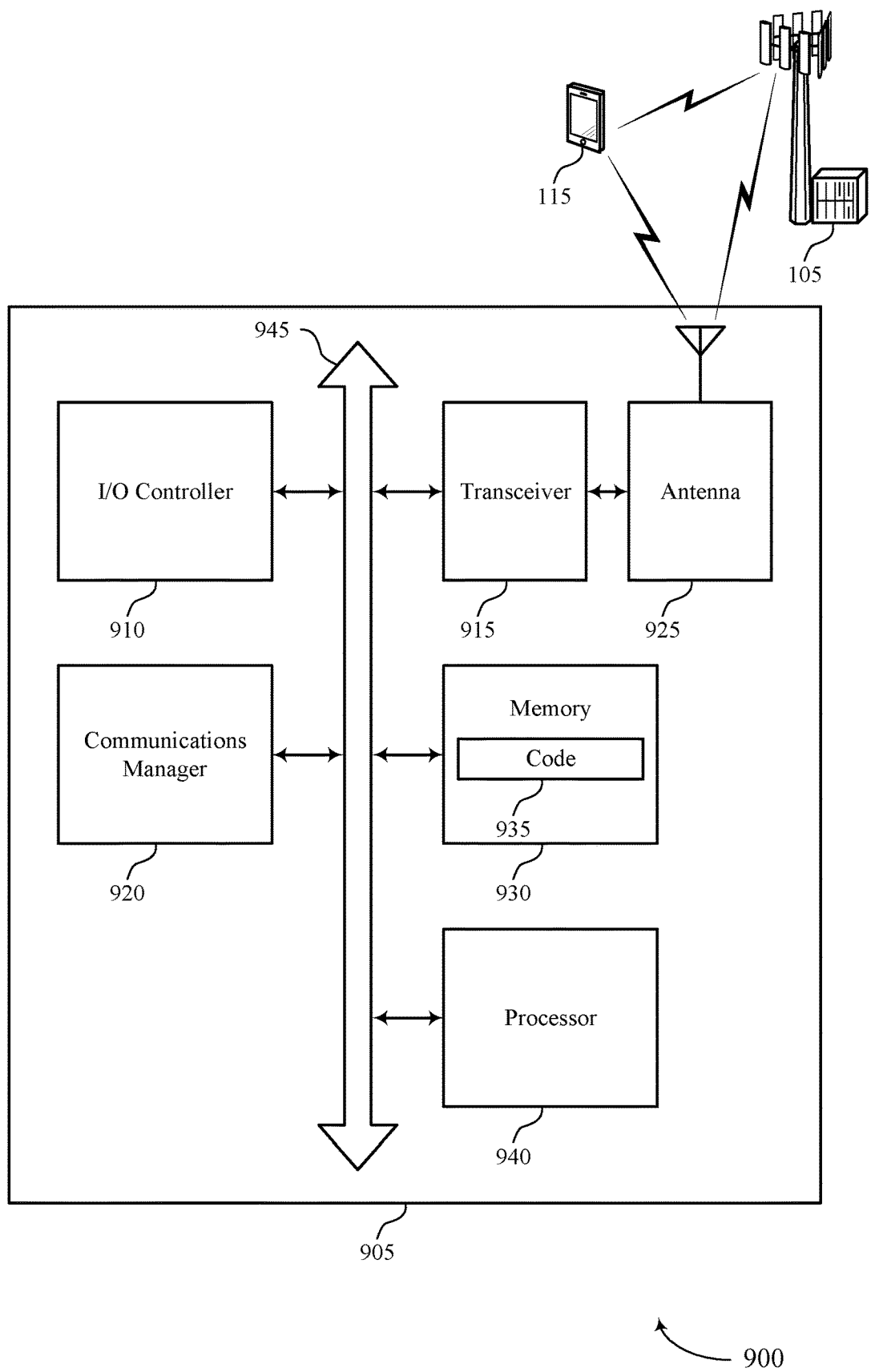
FIG. 9 shows a diagram of a system including a device that supports superimposed SRSs on uplink data transmissions in accordance with one or more aspects of the present disclosure.

FIG. 9 shows a diagram of a system 900 including a device 905 that supports superimposed SRSs on uplink data transmissions in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting superimposed SRSs on uplink data transmissions). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein.

The communications manager 920 may support wireless communications at a UE (e.g., the device 905) in accordance with examples as disclosed herein. For example, the communications manager 920 is capable of, configured to, or operable to support a means for identifying a time and frequency resource allocated to an uplink shared channel. The communications manager 920 is capable of, configured to, or operable to support a means for identifying a threshold SNR associated with the time and frequency resource. The communications manager 920 is capable of, configured to, or operable to support a means for transmitting both an uplink data signal and an SRS via at least the time and frequency resource, where the uplink data signal and the SRS overlap in both time and frequency within the time and frequency resource, and where the uplink data signal is transmitted using a first transmit power and the SRS is transmitted using a second transmit power, the first transmit power and the second transmit power based on the threshold SNR.

By including or configuring the communications manager 920 in accordance with examples as described herein, the device 905 may support techniques for improved communication reliability, reduced latency, and more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of superimposed SRSs on uplink data transmissions as described herein, or the at least one processor 940 and the at least one memory 930 may be otherwise configured to, individually or collectively, perform or support such operations.

Figure 10:
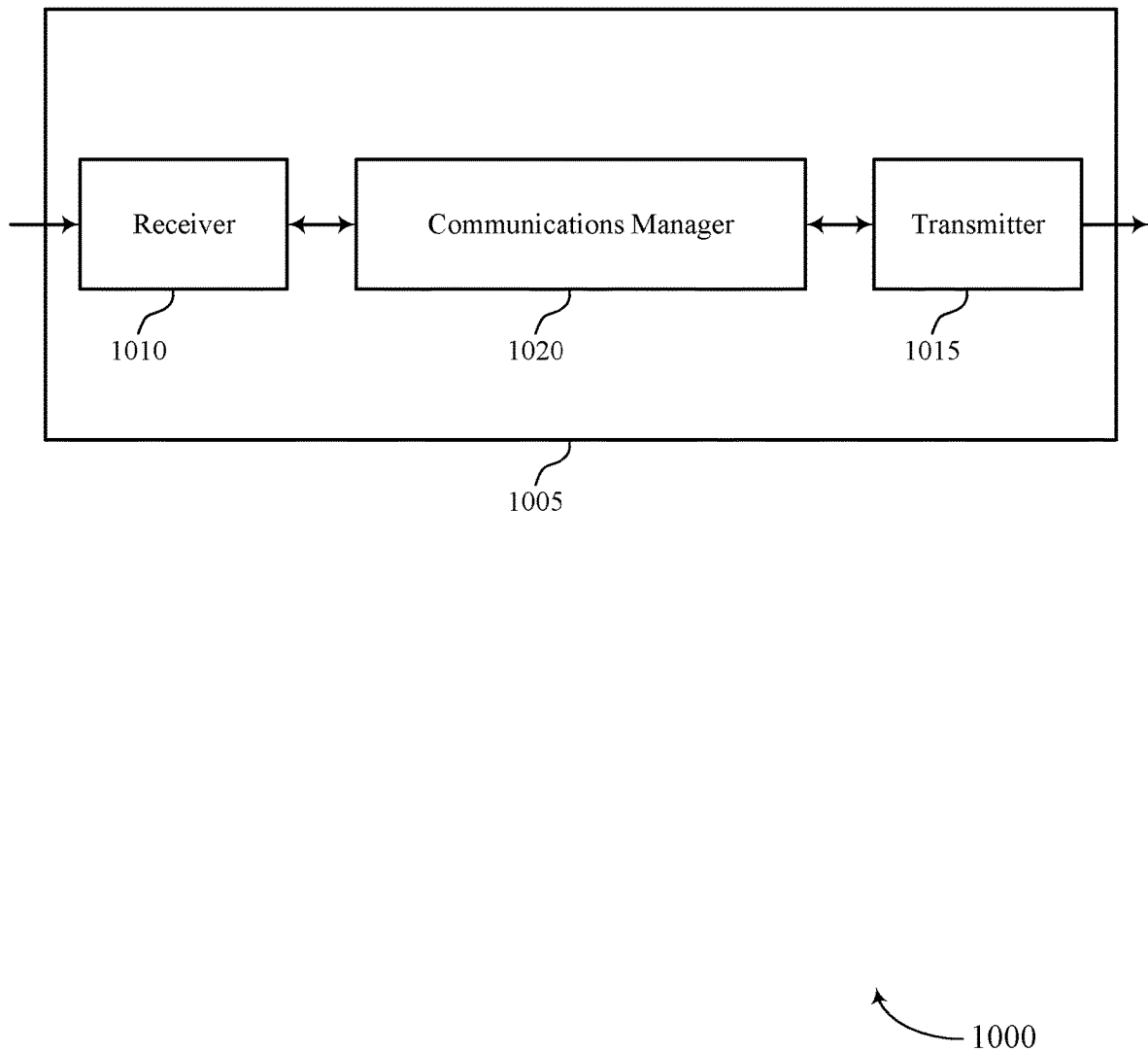
FIGS. 10 and 11 show block diagrams of devices that support superimposed SRSs on uplink data transmissions in accordance with one or more aspects of the present disclosure.

FIG. 10 shows a block diagram 1000 of a device 1005 that supports superimposed SRSs on uplink data transmissions in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of superimposed SRSs on uplink data transmissions as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by executing, by the at least one processor, instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity (e.g., the device 1005) in accordance with examples as disclosed herein. For example, the communications manager 1020 is capable of, configured to, or operable to support a means for obtaining both an uplink data signal and an SRS via at least a time and frequency resource allocated to an uplink shared channel, where the uplink data signal and the SRS overlap in both time and frequency within the time and frequency resource, and where the uplink data signal is obtained with a first received power and the SRS is obtained with a second received power that is less than the first received power, the first received power and the second received power based on a threshold SNR associated with the time and frequency resource. The communications manager 1020 is capable of, configured to, or operable to support a means for decoding the uplink data signal based on the first received power satisfying the threshold SNR. The communications manager 1020 is capable of, configured to, or operable to support a means for processing the SRS based on decoding the uplink data signal.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for more efficient utilization of communication resources.

Figure 11:
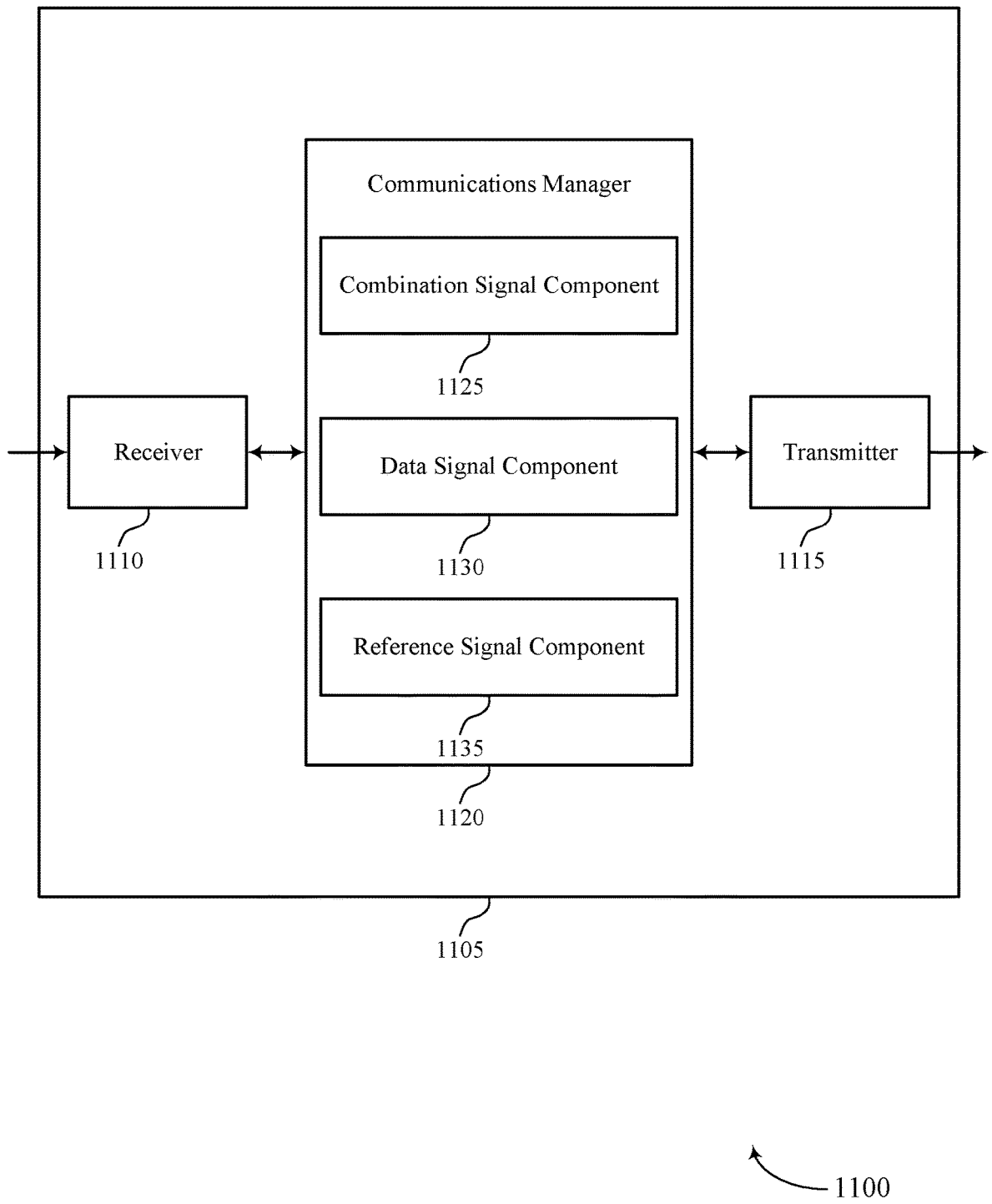

FIG. 11 shows a block diagram 1100 of a device 1105 that supports superimposed SRSs on uplink data transmissions in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may also include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of superimposed SRSs on uplink data transmissions as described herein. For example, the communications manager 1120 may include a combination signal component 1125, a data signal component 1130, a reference signal component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity (e.g., the device 1105) in accordance with examples as disclosed herein. The combination signal component 1125 is capable of, configured to, or operable to support a means for obtaining both an uplink data signal and an SRS via at least a time and frequency resource allocated to an uplink shared channel, where the uplink data signal and the SRS overlap in both time and frequency within the time and frequency resource, and where the uplink data signal is obtained with a first received power and the SRS is obtained with a second received power that is less than the first received power, the first received power and the second received power based on a threshold SNR associated with the time and frequency resource. The data signal component 1130 is capable of, configured to, or operable to support a means for decoding the uplink data signal based on the first received power satisfying the threshold SNR. The reference signal component 1135 is capable of, configured to, or operable to support a means for processing the SRS based on decoding the uplink data signal.

Figure 12:
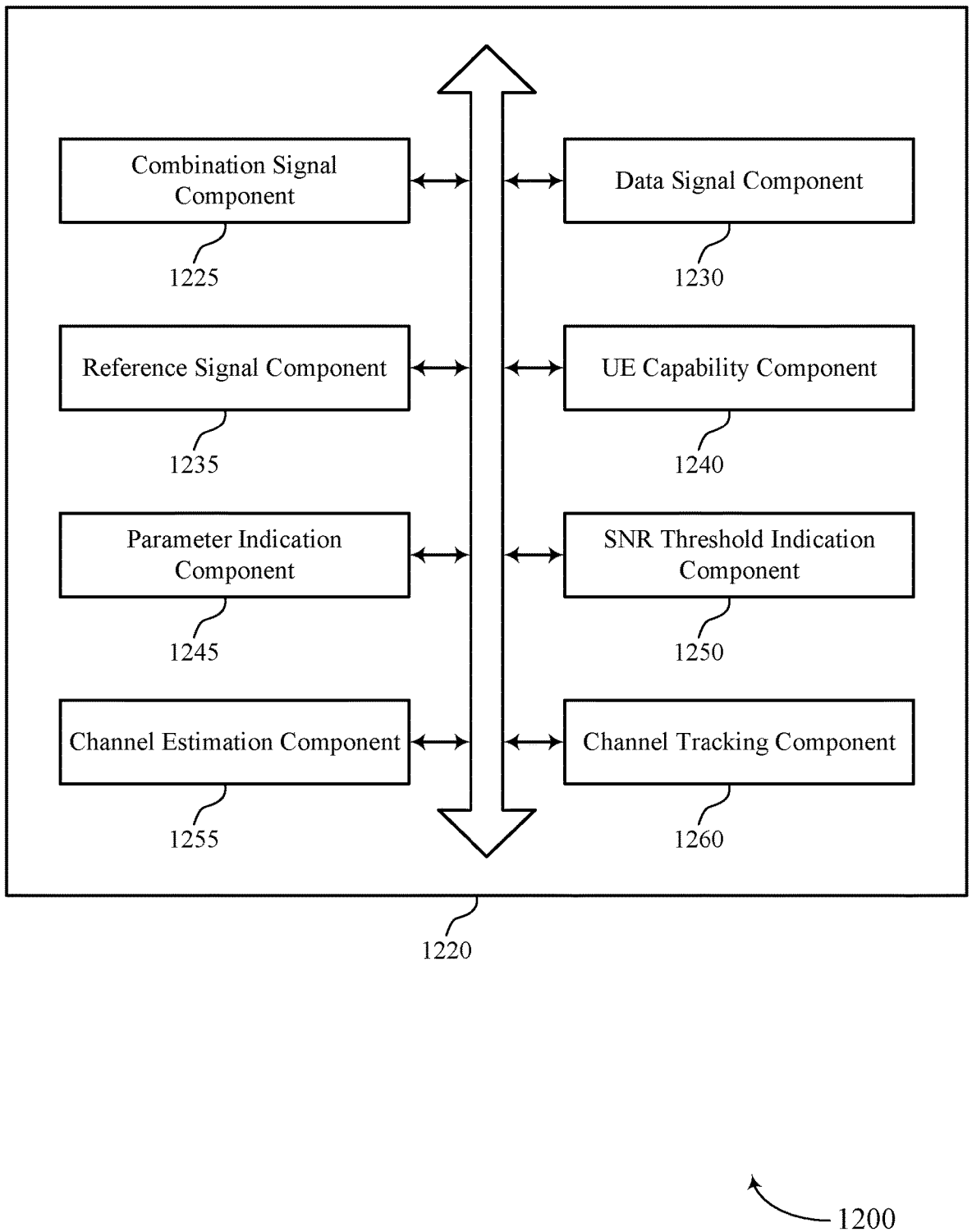
FIG. 12 shows a block diagram of a communications manager that supports superimposed SRSs on uplink data transmissions in accordance with one or more aspects of the present disclosure.

FIG. 12 shows a block diagram 1200 of a communications manager 1220 that supports superimposed SRSs on uplink data transmissions in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of superimposed SRSs on uplink data transmissions as described herein. For example, the communications manager 1220 may include a combination signal component 1225, a data signal component 1230, a reference signal component 1235, a UE capability component 1240, a parameter indication component 1245, an SNR threshold indication component 1250, a channel estimation component 1255, a channel tracking component 1260, or any combination thereof. Each of these components, or components of subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The combination signal component 1225 is capable of, configured to, or operable to support a means for obtaining both an uplink data signal and an SRS via at least a time and frequency resource allocated to an uplink shared channel, where the uplink data signal and the SRS overlap in both time and frequency within the time and frequency resource, and where the uplink data signal is obtained with a first received power and the SRS is obtained with a second received power that is less than the first received power, the first received power and the second received power based on a threshold SNR associated with the time and frequency resource. The data signal component 1230 is capable of, configured to, or operable to support a means for decoding the uplink data signal based on the first received power satisfying the threshold SNR. The reference signal component 1235 is capable of, configured to, or operable to support a means for processing the SRS based on decoding the uplink data signal.

In some examples, to support obtaining both the uplink data signal and the SRS, the combination signal component 1225 is capable of, configured to, or operable to support a means for obtaining a combination signal via at least the time and frequency resource, where the combination signal includes the uplink data signal and the SRS. In some examples, the data signal component 1230 is capable of, configured to, or operable to support a means for subtracting the decoded uplink data signal from the combination signal, where processing the SRS is based on the subtracting.

In some examples, to support obtaining the combination signal, the data signal component 1230 is capable of, configured to, or operable to support a means for obtaining the uplink data signal via the time and frequency resource. In some examples, to support obtaining the combination signal, the reference signal component 1235 is capable of, configured to, or operable to support a means for obtaining the SRS via the time and frequency resource and at least a second time and frequency resource allocated to the uplink shared channel.

In some examples, processing the SRS is based on a processing gain of the SRS, in time or in frequency, across the time and frequency resource and the second time and frequency resource satisfying a threshold processing gain. In some examples, the time and frequency resource occurs during a first slot and the second time and frequency resource occurs during the first slot or a second slot. In some examples, processing the SRS is based on a combined received power of the SRS across the time and frequency resource and the second time and frequency resource satisfying a second threshold SNR.

In some examples, at least a portion of the SRS is superimposed upon at least a portion of the uplink data signal within the time and frequency resource. In some examples, at least a portion of the uplink data signal is superimposed upon at least a portion of the SRS within the time and frequency resource.

In some examples, the UE capability component 1240 is capable of, configured to, or operable to support a means for obtaining an uplink message that indicates a capability of a UE to transmit SRSs via time and frequency resources allocated to the uplink shared channel, where the uplink data signal and the SRS overlapping in both time and frequency within the time and frequency resource is based on the capability.

In some examples, the parameter indication component 1245 is capable of, configured to, or operable to support a means for outputting an indication of one or more parameters for transmission of SRSs via time and frequency resources allocated to the uplink shared channel, where obtaining the uplink data signal and the SRS via the time and frequency resource is in accordance with the one or more parameters.

In some examples, the one or more parameters include a periodicity associated with the transmission of SRSs via time and frequency resources allocated to the uplink shared channel, or the threshold SNR, or both. In some examples, the reference signal component 1235 is capable of, configured to, or operable to support a means for obtaining, via a second time and frequency resource, a second SRS with a third received power that is higher than the second received power.

In some examples, the time and frequency resource is based on a first periodicity that is associated with transmission of SRSs via time and frequency resources allocated to the uplink shared channel. In some examples, the second time and frequency resource is based on a second periodicity that is associated with transmission of SRSs via time and frequency resources not allocated to the uplink shared channel. In some examples, the second periodicity is lower than the first periodicity.

In some examples, the channel estimation component 1255 is capable of, configured to, or operable to support a means for estimating a property of a downlink channel between a UE and the network entity based on the second SRS. In some examples, the channel tracking component 1260 is capable of, configured to, or operable to support a means for tracking the property of the downlink channel based on the SRS.

In some examples, the SNR threshold indication component 1250 is capable of, configured to, or operable to support a means for outputting control signaling that indicates the threshold SNR. In some examples, the threshold SNR is based on an MCS associated with the time and frequency resource, or a rank associated with the time and frequency resource, or both. In some examples, the threshold SNR is based on an SNR associated with decoding the uplink data signal.

Figure 13:
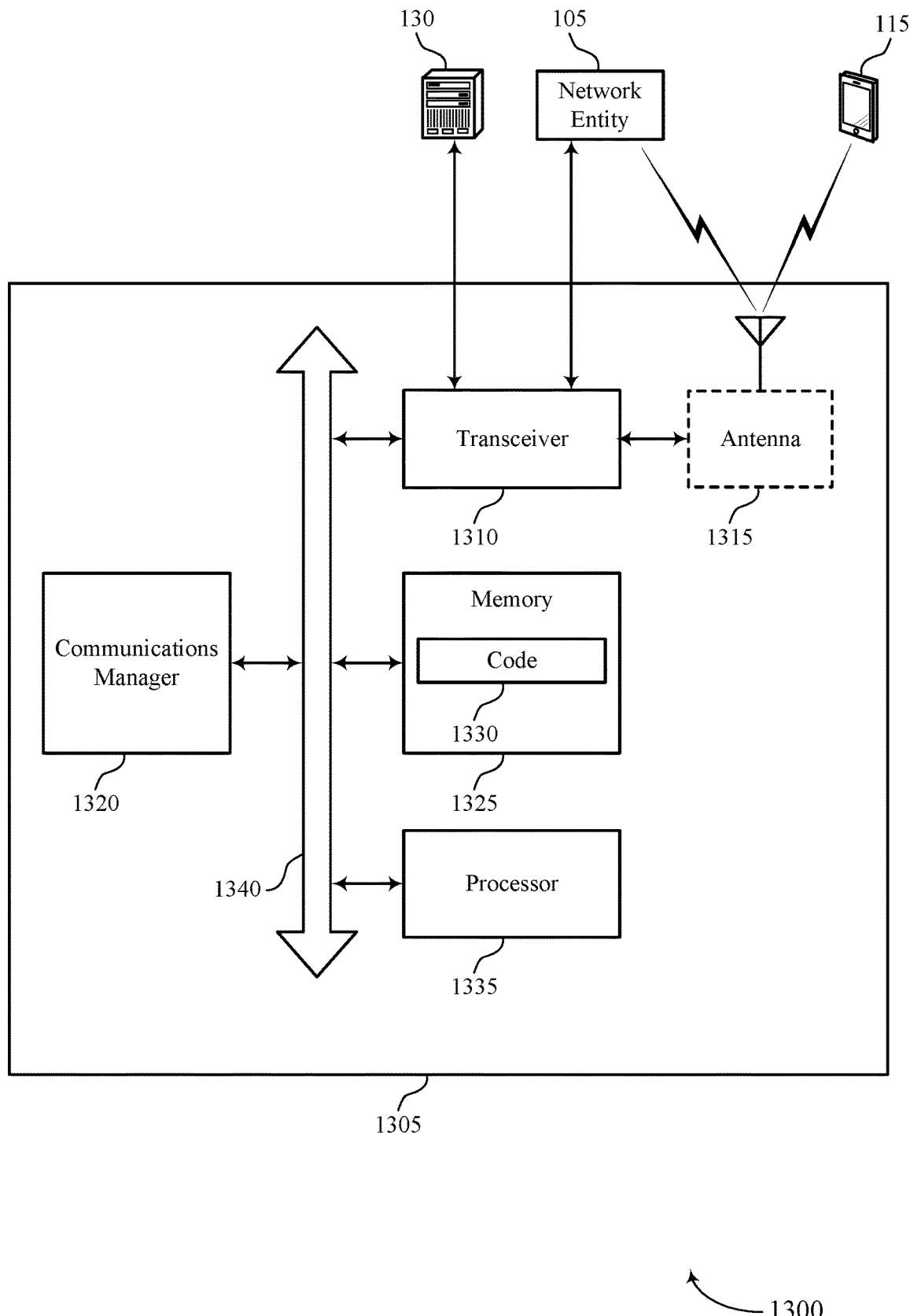
FIG. 13 shows a diagram of a system including a device that supports superimposed SRSs on uplink data transmissions in accordance with one or more aspects of the present disclosure.

FIG. 13 shows a diagram of a system 1300 including a device 1305 that supports superimposed SRSs on uplink data transmissions in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting superimposed SRSs on uplink data transmissions). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some implementations, the at least one processor 1335 may be a component of a processing system.

A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the at least one processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity (e.g., the device 1305) in accordance with examples as disclosed herein. For example, the communications manager 1320 is capable of, configured to, or operable to support a means for obtaining both an uplink data signal and an SRS via at least a time and frequency resource allocated to an uplink shared channel, where the uplink data signal and the SRS overlap in both time and frequency within the time and frequency resource, and where the uplink data signal is obtained with a first received power and the SRS is obtained with a second received power that is less than the first received power, the first received power and the second received power based on a threshold SNR associated with the time and frequency resource. The communications manager 1320 is capable of, configured to, or operable to support a means for decoding the uplink data signal based on the first received power satisfying the threshold SNR. The communications manager 1320 is capable of, configured to, or operable to support a means for processing the SRS based on decoding the uplink data signal.

By including or configuring the communications manager 1320 in accordance with examples as described herein, the device 1305 may support techniques for improved communication reliability, reduced latency, and more efficient utilization of communication resources.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of superimposed SRSs on uplink data transmissions as described herein, or the at least one processor 1335 and the at least one memory 1325 may be otherwise configured to, individually or collectively, perform or support such operations.

Figure 14:
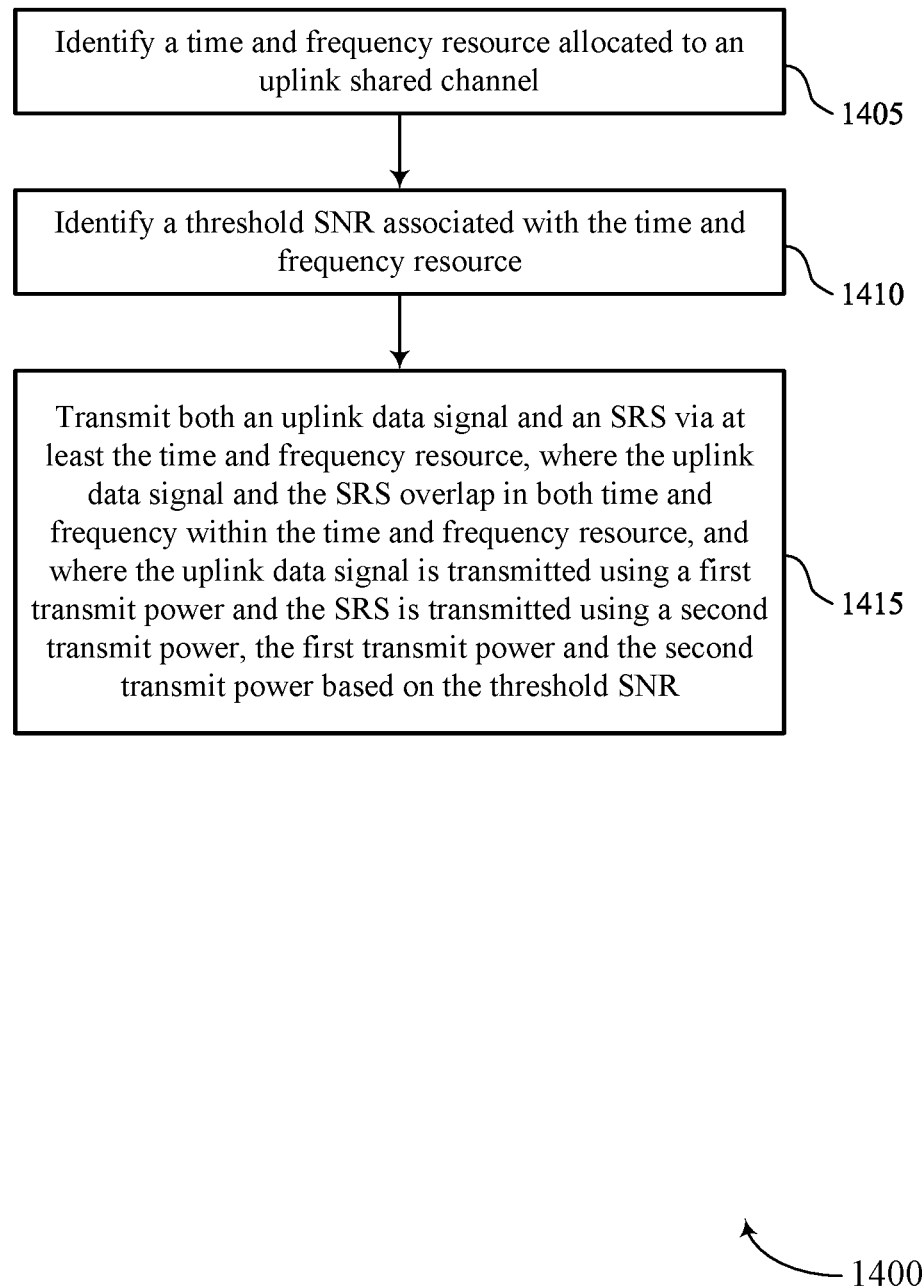
FIGS. 14 and 15 show flowcharts illustrating methods that support superimposed SRSs on uplink data transmissions in accordance with one or more aspects of the present disclosure.

FIG. 14 shows a flowchart illustrating a method 1400 that supports superimposed SRSs on uplink data transmissions in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include identifying a time and frequency resource allocated to an uplink shared channel. The operations of block 1405 may be performed in accordance with examples as disclosed herein. In some examples, aspects of the operations of 1405 may be performed by a resource identification component 825 as described with reference to FIG. 8.

At 1410, the method may include identifying a threshold SNR associated with the time and frequency resource. The operations of block 1410 may be performed in accordance with examples as disclosed herein. In some examples, aspects of the operations of 1410 may be performed by an SNR threshold component 830 as described with reference to FIG. 8.

At 1415, the method may include transmitting both an uplink data signal and an SRS via at least the time and frequency resource, where the uplink data signal and the SRS overlap in both time and frequency within the time and frequency resource, and where the uplink data signal is transmitted using a first transmit power and the SRS is transmitted using a second transmit power, the first transmit power and the second transmit power based on the threshold SNR. The operations of block 1415 may be performed in accordance with examples as disclosed herein. In some examples, aspects of the operations of 1415 may be performed by a signal combiner component 835 as described with reference to FIG. 8.

Figure 15:
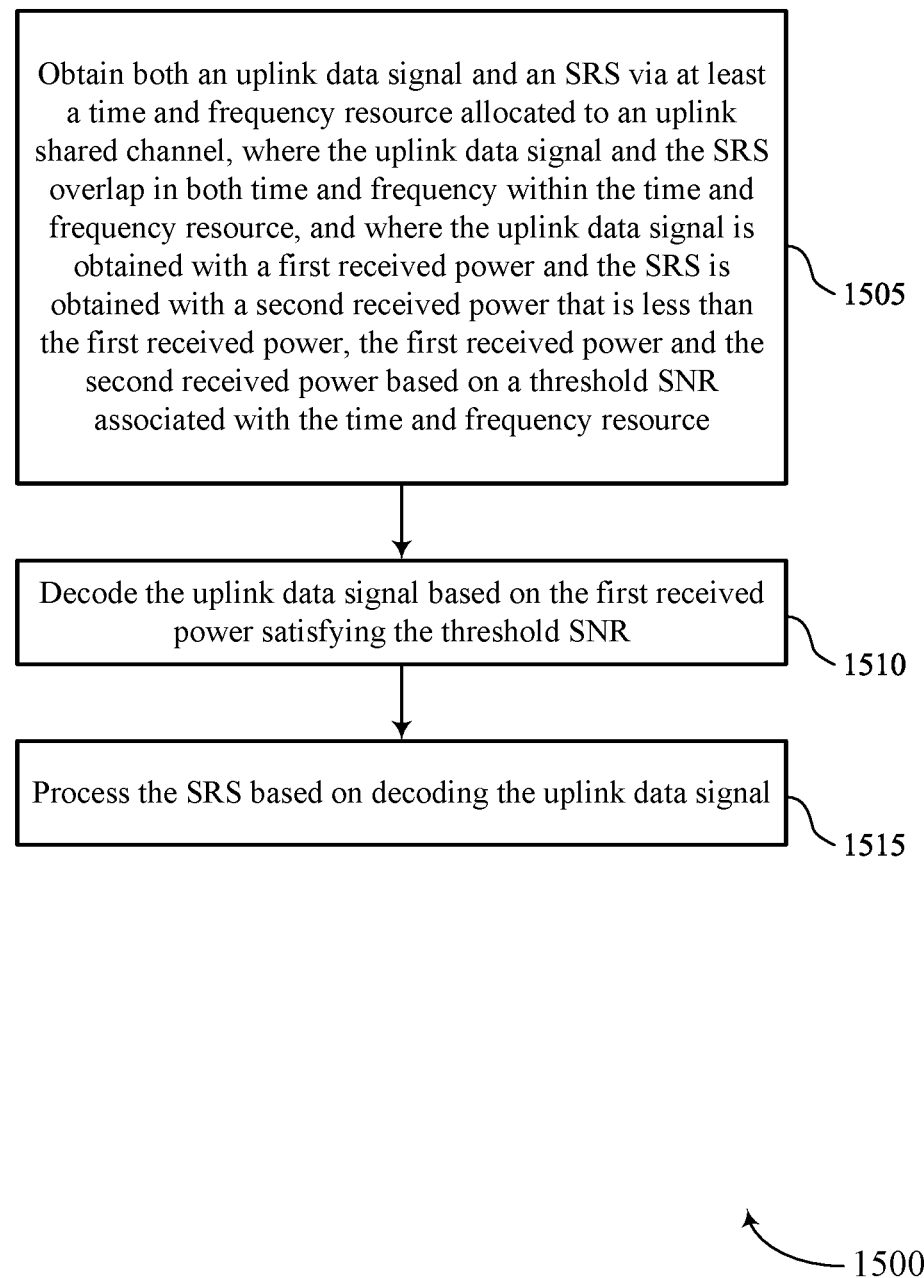

FIG. 15 shows a flowchart illustrating a method 1500 that supports superimposed SRSs on uplink data transmissions in accordance with aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include obtaining both an uplink data signal and an SRS via at least a time and frequency resource allocated to an uplink shared channel, where the uplink data signal and the SRS overlap in both time and frequency within the time and frequency resource, and where the uplink data signal is obtained with a first received power and the SRS is obtained with a second received power that is less than the first received power, the first received power and the second received power based on a threshold SNR associated with the time and frequency resource. The operations of block 1505 may be performed in accordance with examples as disclosed herein. In some examples, aspects of the operations of 1505 may be performed by a combination signal component 1225 as described with reference to FIG. 12.

At 1510, the method may include decoding the uplink data signal based on the first received power satisfying the threshold SNR. The operations of block 1510 may be performed in accordance with examples as disclosed herein. In some examples, aspects of the operations of 1510 may be performed by a data signal component 1230 as described with reference to FIG. 12.

At 1515, the method may include processing the SRS based on decoding the uplink data signal. The operations of block 1515 may be performed in accordance with examples as disclosed herein. In some examples, aspects of the operations of 1515 may be performed by a reference signal component 1235 as described with reference to FIG. 12.

The following provides an overview of aspects of the present disclosure:

Aspect 1: A method for wireless communications at a UE, comprising: identifying a time and frequency resource allocated to an uplink shared channel; identifying a threshold SNR associated with the time and frequency resource; and transmitting both an uplink data signal and an SRS via at least the time and frequency resource, wherein the uplink data signal and the SRS overlap in both time and frequency within the time and frequency resource, and wherein the uplink data signal is transmitted using a first transmit power and the SRS is transmitted using a second transmit power, the first transmit power and the second transmit power based at least in part on the threshold SNR.

Aspect 2: The method of aspect 1, wherein transmitting both the uplink data signal and the SRS comprises: transmitting a combination signal via at least the time and frequency resource, wherein the combination signal comprises the uplink data signal and the SRS.

Aspect 3: The method of aspect 2, wherein transmitting the combination signal comprises: transmitting the uplink data signal via the time and frequency resource; and transmitting the SRS via the time and frequency resource and at least a second time and frequency resource that is also allocated to the uplink shared channel.

Aspect 4: The method of any of aspects 1 through 3, wherein at least a portion of the SRS is superimposed upon at least a portion of the uplink data signal within the time and frequency resource, or at least a portion of the uplink data signal is superimposed upon at least a portion of the SRS within the time and frequency resource.

Aspect 5: The method of any of aspects 1 through 4, further comprising: transmitting an uplink message that indicates a capability of the UE to transmit SRSs via time and frequency resources allocated to the uplink shared channel, wherein the uplink data signal and the SRS overlapping in both time and frequency within the time and frequency resource is based at least in part on the capability.

Aspect 6: The method of any of aspects 1 through 5, further comprising: receiving an indication of one or more parameters for transmission of SRSs via time and frequency resources allocated to the uplink shared channel, wherein transmitting the uplink data signal and the SRS via the time and frequency resource is in accordance with the one or more parameters.

Aspect 7: The method of aspect 6, wherein the one or more parameters comprise a periodicity associated with the transmission of SRSs via time and frequency resources allocated to the uplink shared channel, or the threshold SNR, or both.

Aspect 8: The method of any of aspects 1 through 7, further comprising: transmitting, via a second time and frequency resource, a second SRS using a third transmit power that is higher than the second transmit power.

Aspect 9: The method of aspect 8, wherein the time and frequency resource is based at least in part on a first periodicity that is associated with transmission of SRSs via time and frequency resources allocated to the uplink shared channel, and the second time and frequency resource is based at least in part on a second periodicity that is associated with transmission of SRSs via time and frequency resources not allocated to the uplink shared channel.

Aspect 10: The method of aspect 9, wherein the second periodicity is lower than the first periodicity.

Aspect 11: The method of any of aspects 8 through 10, wherein the second SRS is usable at a network entity for estimating a property of a downlink channel between the UE and the network entity, and the SRS is usable at the network entity for tracking the property.

Aspect 12: The method of any of aspects 1 through 11, wherein identifying the threshold SNR comprises: receiving control signaling that indicates the threshold SNR.

Aspect 13: The method of aspect 12, wherein the control signaling comprises DCI, a MAC-CE, or an RRC message.

Aspect 14: The method of any of aspects 1 through 11, wherein identifying the threshold SNR comprises: identifying, from among a set of threshold SNRs, the threshold SNR based at least in part on the time and frequency resource.

Aspect 15: The method of any of aspects 1 through 14, wherein the threshold SNR is based at least in part on an MCS associated with the time and frequency resource, or a rank associated with the time and frequency resource, or both.

Aspect 16: The method of any of aspects 1 through 15, wherein the threshold SNR is based at least in part on a SNR associated with decoding the uplink data signal.

Aspect 17: A method for wireless communications at a network entity, comprising: obtaining both an uplink data signal and an SRS via at least a time and frequency resource allocated to an uplink shared channel, wherein the uplink data signal and the SRS overlap in both time and frequency within the time and frequency resource, and wherein the uplink data signal is obtained with a first received power and the SRS is obtained with a second received power that is less than the first received power, the first received power and the second received power based at least in part on a threshold SNR associated with the time and frequency resource; decoding the uplink data signal based at least in part on the first received power satisfying the threshold SNR; and processing the SRS based at least in part on decoding the uplink data signal.

Aspect 18: The method of aspect 17, wherein obtaining both the uplink data signal and the SRS comprises: obtaining a combination signal via at least the time and frequency resource, wherein the combination signal comprises the uplink data signal and the SRS.

Aspect 19: The method of aspect 18, further comprising: subtracting the decoded uplink data signal from the combination signal, wherein processing the SRS is based at least in part on the subtracting.

Aspect 20: The method of any of aspects 18 through 19, wherein obtaining the combination signal comprises: obtaining the uplink data signal via the time and frequency resource; and obtaining the SRS via the time and frequency resource and at least a second time and frequency resource allocated to the uplink shared channel.

Aspect 21: The method of aspect 20, wherein processing the SRS is based at least in part on a processing gain of the SRS, in time or in frequency, across the time and frequency resource and the second time and frequency resource satisfying a threshold processing gain.

Aspect 22: The method of aspect 21, wherein the time and frequency resource occurs during a first slot and the second time and frequency resource occurs during the first slot or a second slot.

Aspect 23: The method of any of aspects 20 through 22, wherein processing the SRS is based at least in part on a combined received power of the SRS across the time and frequency resource and the second time and frequency resource satisfying a second threshold SNR.

Aspect 24: The method of any of aspects 17 through 23, wherein at least a portion of the SRS is superimposed upon at least a portion of the uplink data signal within the time and frequency resource, or at least a portion of the uplink data signal is superimposed upon at least a portion of the SRS within the time and frequency resource.

Aspect 25: The method of any of aspects 17 through 24, further comprising: obtaining an uplink message that indicates a capability of a UE to transmit SRSs via time and frequency resources allocated to the uplink shared channel, wherein the uplink data signal and the SRS overlapping in both time and frequency within the time and frequency resource is based at least in part on the capability.

Aspect 26: The method of any of aspects 17 through 25, further comprising: outputting an indication of one or more parameters for transmission of SRSs via time and frequency resources allocated to the uplink shared channel, wherein obtaining the uplink data signal and the SRS via the time and frequency resource is in accordance with the one or more parameters.

Aspect 27: The method of aspect 26, wherein the one or more parameters comprise a periodicity associated with the transmission of SRSs via time and frequency resources allocated to the uplink shared channel, or the threshold SNR, or both.

Aspect 28: The method of any of aspects 17 through 27, further comprising: obtaining, via a second time and frequency resource, a second SRS with a third received power that is higher than the second received power.

Aspect 29: The method of aspect 28, wherein the time and frequency resource is based at least in part on a first periodicity that is associated with transmission of SRSs via time and frequency resources allocated to the uplink shared channel, and the second time and frequency resource is based at least in part on a second periodicity that is associated with transmission of SRSs via time and frequency resources not allocated to the uplink shared channel.

Aspect 30: The method of aspect 29, wherein the second periodicity is lower than the first periodicity.

Aspect 31: The method of any of aspects 28 through 30, further comprising: estimating a property of a downlink channel between a UE and the network entity based at least in part on the second SRS; and tracking the property of the downlink channel based at least in part on the SRS.

Aspect 32: The method of any of aspects 17 through 31, further comprising: outputting control signaling that indicates the threshold SNR.

Aspect 33: The method of any of aspects 17 through 32, wherein the threshold SNR is based at least in part on an MCS associated with the time and frequency resource, or a rank associated with the time and frequency resource, or both.

Aspect 34: The method of any of aspects 17 through 33, wherein the threshold SNR is based at least in part on a SNR associated with decoding the uplink data signal.

Aspect 35: An apparatus for wireless communications at a UE, comprising at least one processor; at least one memory coupled with the at least one processor; and instructions stored in the at least one memory and executable by the at least one processor to cause the apparatus to perform a method of any of aspects 1 through 16.

Aspect 36: An apparatus for wireless communications at a UE, comprising at least one means for performing a method of any of aspects 1 through 16.

Aspect 37: A non-transitory computer-readable medium storing code for wireless communications at a UE, the code comprising instructions executable by a processor to perform a method of any of aspects 1 through 16.

Aspect 38: An apparatus for wireless communications at a network entity, comprising at least one processor; at least one memory coupled with the at least one processor; and instructions stored in the at least one memory and executable by the at least one processor to cause the apparatus to perform a method of any of aspects 17 through 34.

Aspect 39: An apparatus for wireless communications at a network entity, comprising at least one means for performing a method of any of aspects 17 through 34.

Aspect 40: A non-transitory computer-readable medium storing code for wireless communications at a network entity, the code comprising instructions executable by a processor to perform a method of any of aspects 17 through 34.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Also, as used herein, the phrase "a set" shall be construed as including the possibility of a set with one member. That is, the phrase "a set" shall be construed in the same manner as "one or more."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   at least one processor; and
   at least one memory coupled with the at least one processor, the at least one memory storing instructions executable by the at least one processor to cause the apparatus to:
   identify a time and frequency resource allocated to an uplink shared channel;
   identify a threshold signal-to-noise ratio associated with the time and frequency resource; and
   transmit both an uplink data signal and a sounding reference signal via at least the time and frequency resource, wherein the uplink data signal and the sounding reference signal overlap in both time and frequency within the time and frequency resource, and wherein the uplink data signal is transmitted using a first transmit power and the sounding reference signal is transmitted using a second transmit power, the first transmit power and the second transmit power based at least in part on the threshold signal-to-noise ratio.

2. The apparatus of claim 1, wherein, to transmit both the uplink data signal and the sounding reference signal, the instructions are executable by the at least one processor to cause the apparatus to:
   transmit a combination signal via at least the time and frequency resource, wherein the combination signal comprises the uplink data signal and the sounding reference signal.

3. The apparatus of claim 2, wherein, to transmit the combination signal, the instructions are executable by the at least one processor to cause the apparatus to:
   transmit the uplink data signal via the time and frequency resource; and
   transmit the sounding reference signal via the time and frequency resource and at least a second time and frequency resource that is also allocated to the uplink shared channel.

4. The apparatus of claim 1, wherein:
   at least a portion of the sounding reference signal is superimposed upon at least a portion of the uplink data signal within the time and frequency resource, or
   at least a portion of the uplink data signal is superimposed upon at least a portion of the sounding reference signal within the time and frequency resource.

5. The apparatus of claim 1, wherein the instructions are further executable by the at least one processor to cause the apparatus to:
   transmit an uplink message that indicates a capability of the UE to transmit sounding reference signals via time and frequency resources allocated to the uplink shared channel, wherein the uplink data signal and the sounding reference signal overlapping in both time and frequency within the time and frequency resource is based at least in part on the capability.

6. The apparatus of claim 1, wherein the instructions are further executable by the at least one processor to cause the apparatus to:
   receive an indication of one or more parameters for transmission of sounding reference signals via time and frequency resources allocated to the uplink shared channel, wherein the instructions are executable by the at least one processor to cause the apparatus to transmit the uplink data signal and the sounding reference signal via the time and frequency resource in accordance with the one or more parameters.

7. The apparatus of claim 6, wherein the one or more parameters comprise a periodicity associated with the transmission of sounding reference signals via time and frequency resources allocated to the uplink shared channel, or the threshold signal-to-noise ratio, or both.

8. The apparatus of claim 1, wherein the instructions are further executable by the at least one processor to cause the apparatus to:
   transmit, via a second time and frequency resource, a second sounding reference signal using a third transmit power that is higher than the second transmit power.

9. The apparatus of claim 8, wherein:
   the time and frequency resource is based at least in part on a first periodicity that is associated with transmission of sounding reference signals via time and frequency resources allocated to the uplink shared channel, and
   the second time and frequency resource is based at least in part on a second periodicity that is associated with transmission of sounding reference signals via time and frequency resources not allocated to the uplink shared channel.

10. The apparatus of claim 9, wherein the second periodicity is lower than the first periodicity.

11. The apparatus of claim 8, wherein:
    the second sounding reference signal is usable at a network entity for estimating a property of a downlink channel between the UE and the network entity, and
    the sounding reference signal is usable at the network entity for tracking the property.

12. The apparatus of claim 1, wherein, to identify the threshold signal-to-noise ratio, the instructions are executable by the at least one processor to cause the apparatus to:
    receive control signaling that indicates the threshold signal-to-noise ratio.

13. The apparatus of claim 1, wherein, to identify the threshold signal-to-noise ratio, the instructions are executable by the at least one processor to cause the apparatus to:
    identify, from among a set of threshold signal-to-noise ratios, the threshold signal-to-noise ratio based at least in part on the time and frequency resource.

14. The apparatus of claim 1, wherein the threshold signal-to-noise ratio is based at least in part on a modulation and coding scheme associated with the time and frequency resource, or a rank associated with the time and frequency resource, or both.

15. The apparatus of claim 1, wherein the threshold signal-to-noise ratio is based at least in part on a signal-to-noise ratio associated with decoding the uplink data signal.

16. An apparatus for wireless communications at a network entity, comprising:
at least one processor; and
at least one memory coupled with the at least one processor, the at least one memory storing instructions executable by the at least one processor to cause the apparatus to:
obtain both an uplink data signal and a sounding reference signal via at least a time and frequency resource allocated to an uplink shared channel, wherein the uplink data signal and the sounding reference signal overlap in both time and frequency within the time and frequency resource, and wherein the uplink data signal is obtained with a first received power and the sounding reference signal is obtained with a second received power that is less than the first received power, the first received power and the second received power based at least in part on a threshold signal-to-noise ratio associated with the time and frequency resource;
decode the uplink data signal based at least in part on the first received power satisfying the threshold signal-to-noise ratio; and
process the sounding reference signal based at least in part on decoding the uplink data signal.

17. The apparatus of claim 16, wherein, to obtain both the uplink data signal and the sounding reference signal, the instructions are executable by the at least one processor to cause the apparatus to:
obtain a combination signal via at least the time and frequency resource, wherein the combination signal comprises the uplink data signal and the sounding reference signal.

18. The apparatus of claim 17, wherein the instructions are further executable by the at least one processor to cause the apparatus to:
subtract the decoded uplink data signal from the combination signal, wherein the instructions are executable by the at least one processor to cause the apparatus to process the sounding reference signal based at least in part on the subtracting.

19. The apparatus of claim 17, wherein, to obtain the combination signal, the instructions are executable by the at least one processor to cause the apparatus to:
obtain the uplink data signal via the time and frequency resource; and
obtain the sounding reference signal via the time and frequency resource and at least a second time and frequency resource allocated to the uplink shared channel.

20. The apparatus of claim 19, wherein the instructions are executable by the at least one processor to cause the apparatus to process the sounding reference signal based at least in part on a processing gain of the sounding reference signal, in time or in frequency, across the time and frequency resource and the second time and frequency resource satisfying a threshold processing gain.

21. The apparatus of claim 20, wherein the time and frequency resource occurs during a first slot and the second time and frequency resource occurs during the first slot or a second slot.

22. The apparatus of claim 19, wherein the instructions are executable by the at least one processor to cause the apparatus to process the sounding reference signal based at least in part on a combined received power of the sounding reference signal across the time and frequency resource and the second time and frequency resource satisfying a second threshold signal-to-noise ratio.

23. The apparatus of claim 16, wherein:
at least a portion of the sounding reference signal is superimposed upon at least a portion of the uplink data signal within the time and frequency resource, or
at least a portion of the uplink data signal is superimposed upon at least a portion of the sounding reference signal within the time and frequency resource.

24. The apparatus of claim 16, wherein the instructions are further executable by the at least one processor to cause the apparatus to:
obtain an uplink message that indicates a capability of a user equipment (UE) to transmit sounding reference signals via time and frequency resources allocated to the uplink shared channel, wherein the uplink data signal and the sounding reference signal overlapping in both time and frequency within the time and frequency resource is based at least in part on the capability.

25. The apparatus of claim 16, wherein the instructions are further executable by the at least one processor to cause the apparatus to:
output an indication of one or more parameters for transmission of sounding reference signals via time and frequency resources allocated to the uplink shared channel, wherein the instructions are executable by the at least one processor to cause the apparatus to obtain the uplink data signal and the sounding reference signal via the time and frequency resource in accordance with the one or more parameters.

26. The apparatus of claim 16, wherein the instructions are further executable by the at least one processor to cause the apparatus to:
obtain, via a second time and frequency resource, a second sounding reference signal with a third received power that is higher than the second received power.

27. The apparatus of claim 26, wherein the instructions are further executable by the at least one processor to cause the apparatus to:
estimate a property of a downlink channel between a user equipment (UE) and the network entity based at least in part on the second sounding reference signal; and
track the property of the downlink channel based at least in part on the sounding reference signal.

28. The apparatus of claim 16, wherein the instructions are further executable by the at least one processor to cause the apparatus to:
output control signaling that indicates the threshold signal-to-noise ratio.

29. A method for wireless communications at a user equipment (UE), comprising:
identifying a time and frequency resource allocated to an uplink shared channel;
identifying a threshold signal-to-noise ratio associated with the time and frequency resource; and
transmitting both an uplink data signal and a sounding reference signal via at least the time and frequency resource, wherein the uplink data signal and the sounding reference signal overlap in both time and frequency within the time and frequency resource, and wherein the uplink data signal is transmitted using a first transmit power and the sounding reference signal is transmitted using a second transmit power, the first transmit power and the second transmit power based at least in part on the threshold signal-to-noise ratio.

30. A method for wireless communications at a network entity, comprising:

obtaining both an uplink data signal and a sounding reference signal via at least a time and frequency resource allocated to an uplink shared channel, wherein the uplink data signal and the sounding reference signal overlap in both time and frequency within the time and frequency resource, and wherein the uplink data signal is obtained with a first received power and the sounding reference signal is obtained with a second received power that is less than the first received power, the first received power and the second received power based at least in part on a threshold signal-to-noise ratio associated with the time and frequency resource;

decoding the uplink data signal based at least in part on the first received power satisfying the threshold signal-to-noise ratio; and processing the sounding reference signal based at least in part on decoding the uplink data signal.

* * * * *